(12) United States Patent
Parulski et al.

(10) Patent No.: US 7,369,164 B2
(45) Date of Patent: May 6, 2008

(54) USING FAVORITE DIGITAL IMAGES TO ORGANIZE AND IDENTIFY ELECTRONIC ALBUMS

(75) Inventors: Kenneth A. Parulski, Rochester, NY (US); Steven M. Bryant, Holley, NY (US); Edward O. Wolf, Fairport, NY (US); Lonne R. Lyon, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 731 days.

(21) Appl. No.: 10/411,753

(22) Filed: Apr. 11, 2003

(65) Prior Publication Data

US 2004/0201752 A1 Oct. 14, 2004

(51) Int. Cl.
*H04N 5/225* (2006.01)
*H04N 5/76* (2006.01)

(52) U.S. Cl. ............................ 348/231.99; 348/333.02; 348/231.2; 707/104.1; 715/835

(58) Field of Classification Search ................ 358/527; 348/207.99, 231.99, 207.1, 231.2, 231.3, 348/231.5, 231.6, 333.01, 333.02, 333.05; 715/513, 835–838; 707/104.1
See application file for complete search history.

(56) References Cited

U.S. PATENT DOCUMENTS

| 5,164,831 | A | 11/1992 | Kuchta et al. |
| 5,633,678 | A | 5/1997 | Parulski et al. |
| 5,760,917 | A | 6/1998 | Sheridan |
| 6,223,190 | B1 | 4/2001 | Aihara et al. |
| 6,301,586 | B1* | 10/2001 | Yang et al. ............... 707/104.1 |
| 6,784,925 | B1* | 8/2004 | Tomat et al. .......... 348/207.11 |
| 6,912,002 | B1* | 6/2005 | Soga ....................... 348/231.2 |

(Continued)

OTHER PUBLICATIONS

Allan Kuchinsky et al., FotoFile: A Consumer Multimedia Organization and Retrieval System,Japan Electronic Industry Development Association, Version 2.1, 8.*

(Continued)

*Primary Examiner*—David Ometz
*Assistant Examiner*—Pritham D. Prabhakher
(74) *Attorney, Agent, or Firm*—Thomas J. Strouse

(57) ABSTRACT

A method for capturing images using a digital camera and organizing the captured images for storage into electronic albums, comprising the steps of capturing and storing first and second groups of digital images using a digital camera; identifying favorite images for the first and second groups of digital images; storing data in the digital camera identifying the first and second groups of digital images, including data indicating the identified favorite images from the first and second group of digital images; transferring the first and second groups of digital images, and the data identifying the first and second groups of digital images and the identified favorite images, from the digital camera to a computer; producing a first electronic album including the first group of digital images and a second electronic album including the second group of digital images; and using the favorite image from the first group of digital images to represent the first electronic album, and the favorite image from the second group of digital images to represent the second electronic album.

37 Claims, 22 Drawing Sheets

U.S. PATENT DOCUMENTS

| | | | | |
|---|---|---|---|---|
| 6,970,192 | B2* | 11/2005 | Takayama | 348/231.2 |
| 6,976,229 | B1* | 12/2005 | Balabanovic et al. | 715/838 |
| 7,034,880 | B1* | 4/2006 | Endsley et al. | 348/333.11 |
| 7,098,947 | B2* | 8/2006 | Iwauchi | 348/231.1 |
| 7,248,290 | B2* | 7/2007 | Shioji | 348/231.2 |
| 2001/0030695 | A1* | 10/2001 | Prabhu et al. | 348/232 |
| 2002/0080252 | A1* | 6/2002 | Nagaoka et al. | 348/232 |
| 2002/0172502 | A1* | 11/2002 | Okamoto et al. | 386/95 |
| 2004/0119722 | A1* | 6/2004 | Hilbert et al. | 345/619 |

OTHER PUBLICATIONS

Kodak Picture Easy Software 3.0 FAQ, http://www.kodak.com/global/en/service/faqs/faq1541.shtml.*

FotoFile: A Consumer Multimedia Organization and Retrieval System by Allan Kuchinsky et al., Interactive Media Laboratory: Department of Mechanical and Industrial Engineering, University of Toronto.

"Digital Still Camera Image File Format Standard", Japan Electronic Industry Development Association Standard, version 2.1 JEIDA-49-1998, Revised Jun. 1998.

* cited by examiner

```
1   [HDR]
2   GEN CRT = "KODAK DX4330 DIGITAL CAMERA"
3   GEN SRN = 00100245
4   GEN DTM = 2002:10:12:12:44:41
5   [JOB]
6   GRP PID = 001
7   IMG FMT = EXIF2 -J
8   IMG SRC = "../DCIM/103K4330/100_1686.JPG"
9   [JOB]
10  GRP PID = 002
11  IMG FMT = EXIF2 -J
12  IMG SRC = "../DCIM/103K4330/100_1689.JPG"
13  [JOB]
14  GRP PID = 003
15  IMG FMT = EXIF2 -J
16  IMG SRC = "../DCIM/103K4330/100_1693.JPG"
17  [JOB]
18  FAV PID = 001
19  IMG FMT = EXIF2 -J
20  IMG SRC = "../DCIM/103K4330/100_1687.JPG"
21  [JOB]
22  FAV PID = 002
23  IMG FMT = EXIF2 -J
24  IMG SRC = "../DCIM/103K4330/100_1691.JPG"
25  [JOB]
26  FAV PID = 003
27  IMG FMT = EXIF2 -J
28  IMG SRC = "../DCIM/103K4330/100_1695.JPG"
```

*FIG. 6*

```
1   [HDR]
2   GEN CRT = "KODAK DX4330 DIGITAL CAMERA"
3   GEN SRN = 00100245
4   GEN DTM = 2002:10:12:12:44:41
5   [JOB]
6   EBY PID = 001
7   IMG FMT = EXIF2 -J
8   IMG SRC = "../DCIM/103K4330/100_1686.JPG"
9   [JOB]
10  FAV PID = 001
11  IMG FMT = EXIF2 -J
12  IMG SRC = "../DCIM/103K4330/100_1687.JPG"
13  [JOB]
14  EBY PID = 002
15  IMG FMT = EXIF2 -J
16  IMG SRC = "../DCIM/103K4330/100_1689.JPG"
17  [JOB]
18  FAV PID = 002
19  IMG FMT = EXIF2 -J
20  IMG SRC = "../DCIM/103K4330/100_1691.JPG"
21  [JOB]
22  EBY PID = 003
23  IMG FMT = EXIF2 -J
24  IMG SRC = "../DCIM/103K4330/100_1693.JPG"
25  [JOB]
26  FAV PID = 003
27  IMG FMT = EXIF2 -J
28  IMG SRC = "../DCIM/103K4330/100_1695.JPG"
```

*FIG. 12*

USING FAVORITE DIGITAL IMAGES TO ORGANIZE AND IDENTIFY ELECTRONIC ALBUMS

CROSS REFERENCE TO RELATED APPLICATIONS

Reference is made to commonly-assigned U.S. patent application Ser. No. 10/412,521, filed concurrently herewith by Kenneth A. Parulski et al., entitled "Classifying Digital Images as Favorite Images Using a Digital Camera"; reference is made to commonly-assigned U.S. patent application Ser. No. 10/411,755, filed concurrently herewith by Steven M. Bryant et al., entitled "Grouping Digital Images Using a Digital Camera"; reference is made to commonly-assigned U.S. patent application Ser. No. 10/412,457, filed concurrently herewith by Steven M. Bryant, et al., entitled "A Digital Camera Including an On-Line Sales Mode"; reference is made to commonly-assigned U.S. patent application Ser. No. 10/412,517, filed concurrently herewith by Steven M. Bryant, et al., entitled "Method for Producing Electronic Job Pages"; the disclosures of which are incorporated herein by reference.

FIELD OF THE INVENTION

The present invention relates to digital cameras that capture digital images and, more particularly, using favorite images captured by a digital camera to organize and identify electronic albums.

BACKGROUND OF THE INVENTION

Digital cameras are used by a growing number of consumer and professional photographers. These cameras use one or more CCD or CMOS image sensors to capture images, and digitally process these captured images to produce digital image files, which are stored in a digital memory in the camera. The digital image files can then be viewed, stored, retrieved, and printed using a home computer, and can be uploaded to a web site for viewing.

The digital camera can include a user control for selecting one or more categories for images to be captured, as described in commonly-assigned U.S. Pat. No. 5,633,678 "Electronic Still Camera For Capturing And Categorizing Images" to Parulski et. al., the disclosure of which is herein incorporated by reference. Alternatively, the stored digital images can be organized later when they are transferred to the computer using appropriate software. For example, the software can enable images to be organized into categories according to the people, places, subjects or events depicted, as described in a paper entitled "FotoFile: A Consumer Multimedia Organization and Retrieval System" by Kuchinsky et al. The Kuchinsky et al. paper describes metadata attributes that are used to describe certain images, including a "favorite" attribute that is used to indicate the "best" images in a user's collection. However, in the Kuchinsky et al. paper, "favorites" can only be selected when the images are reviewed on the PC, not when they are captured using a camera.

Various types of metadata related to images have been standardized. For example, the International Organization for Standardization (ISO) group ISO/IEC JTC1/SC29/WG11, "Coding of Moving Pictures and Audio", has developed an "MPEG-7 Requirements Document" V.8, No. N2727, March 1999, which defines various types of metadata that can be stored with moving images. Also, the Digital Imaging Group (DIG) has developed the DIG35 metadata standard. However, neither of these specifications defines metadata which indicates that an image is a favorite image for a particular user.

SUMMARY OF THE INVENTION

It is an object of the present invention to organize and identify electronic albums using favorite images captured by a digital camera.

This object is achieved by a method for capturing images using a digital camera and organizing the captured images for storage into electronic albums, comprising the steps of capturing and storing a first group of digital images using a digital camera; designating, in response to a user input, that subsequent captured digital images are to form a second group of digital images; capturing and storing a second group of digital images using the digital camera; and identifying at least one favorite image for the first group of digital images, and at least one favorite image for the second group of digital images. The method further comprises the steps of storing data in the digital camera identifying the first and second groups of digital images, including data indicating the identified favorite images from the first and second group of digital images; transferring the first and second groups of digital images, and the data identifying the first and second groups of digital images and the identified favorite images, from the digital camera to a computer; producing a first electronic album including the first group of digital images and a second electronic album including the second group of digital images; and using the favorite image from the first group of digital images to represent the first electronic album, and the favorite image from the second group of digital images to represent the second electronic album.

ADVANTAGES

It is an advantage of the present invention to enable a user to group and classify digital images as the images are captured using a digital camera.

It is an additional advantage of the present invention to provide a simple method of identifying favorite images as the images are captured using a digital camera.

It is a further advantage of the present invention to provide a simple method for grouping digital images into distinct sets of images as they are captured using a digital camera.

It is a further advantage of the present invention to provide a computer database that utilizes the classification and grouping information created in the digital camera to improve the retrieval and utilization of the digital images captured using the digital camera.

BRIEF DESCRIPTION OF THE DRAWINGS

FIG. 6 depicts a first utilization file for identifying groups of images and favorite images;

FIG. 12 depicts a second utilization file for identifying groups of images corresponding to electronic job pages and favorite images;

DETAILED DESCRIPTION OF THE INVENTION

Figure 1:
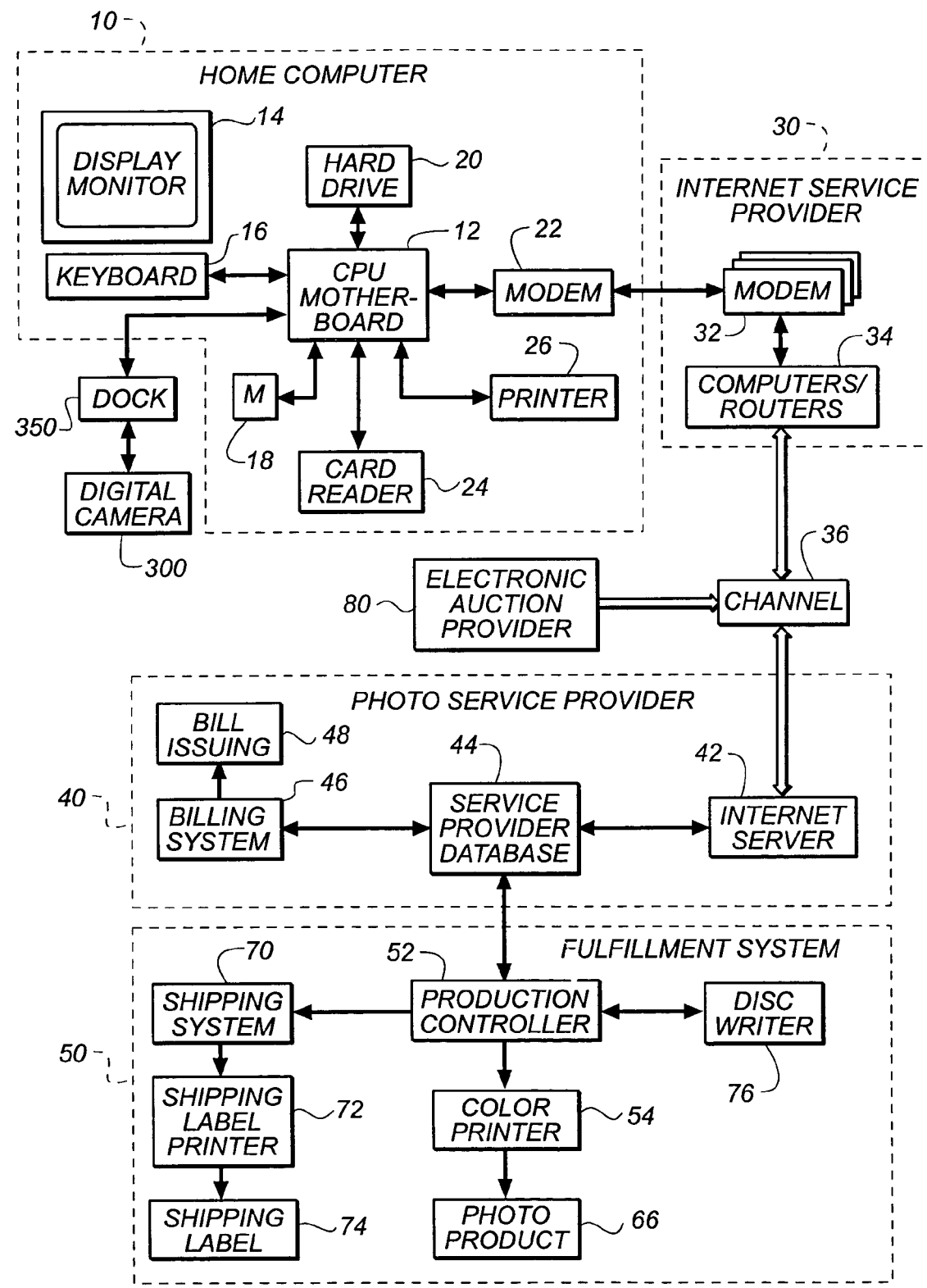
FIG. 1 depicts a block diagram of a digital photography system.

The present invention defines methods for grouping and classifying digital still images and digital motion images captured using a handheld digital camera. The grouping can be done manually by the camera user, by pressing a "new group" button on the digital camera before capturing a group of digital images. The classification can be done manually by the camera user, for example, by identifying a "favorite" image within each group of captured images, using a control button on the digital camera as the user reviews the group of captured digital images on the camera's image display. A user identifier can also be stored along with the classification data, in order to identify the particular camera user for whom the classification was made. In one embodiment of the present invention, the grouping and classification data is stored in a database on a host computer, and can later be used in retrieving digital images and in producing hardcopy output, such as album pages. In a second embodiment, the grouping and classification data is used to create "electronic job pages", where each group of images corresponds to one "job", such as an item offered for sale electronically. By grouping the images on the digital camera as they are captured, the process of later creating the "electronic job pages" on a computer is greatly simplified, since the images are already organized into the appropriate job groups. In a third embodiment, the digital camera includes a wireless modem which transmits some of the captured images to a service provider, and the grouping and classification information is used to simplify the process of selecting and organizing the images stored by a local host computer and by the service provider.

The classification provides "affective information," which is herein defined as information that relates to the feelings or emotions of a person toward images. This affective information usually describes or represents a person's subjective reaction to a given image. One very important type of affective information is the level of importance a user associates with an image, such as whether the image is a "favorite". For example, a user may take dozens of still photographs or video segments during an event, such as a wedding or Christmas celebration. Out of these many images, there are normally only a few that the user feels are particularly special, or "favorite" images.

Affective information can be stored using a "tag" or "flag", associated with an image, which indicates whether or not the image has been identified as a "favorite" or "important" image for the user. The absence of such a tag indicates that the image has not been identified as a favorite or important image for the user. Such tag represents a binary categorization, classifying images into "favorite" and "normal" categories. Alternatively, favorite images can be categorized into a range of levels. For example, images can be classified between a range of −10 to +10, where 0 is used for an unclassified image, +10 is used for the "most favorite" image or images, and −10 is used for the "least favorite" image or images.

Different users can have different emotional reactions to the same image. Therefore, to be most useful, affective information relating to images should be associated with a particular user, if the images are to be shared with various users. In some embodiments, this is accomplished by associating a user identifier with the affective information. The user identifier can be any type of information that helps enable a particular user to be identified. For example, the user identifier can be a personal identification code such as a globally unique ID (GUID), a user number, a social security number, a camera serial number, or the like. The user identifier can also be a complete legal name, a nickname, a computer user name, or the like. The user identifier can be stored along with the affective information at the time the image is classified using the digital camera, or can alternatively be added when the images are transferred from the digital camera to a host computer. In the latter case, an identification number such as a serial number associated with the camera can be stored within the image files, and a user identifier can later be associated with this serial number.

When the affective information is stored in association with a user identifier, it is known as "personal affective information". The affective information and user identifier are types of image "metadata", which is a term used for any information relating to an image. Examples of other types of image metadata include image capture time, capture device, capture location, date of capture, and image capture parameters (such as lens f-number, focus distance).

The affective information, such as whether an image is classified as a "favorite", can be associated with a digital image by storing the classification data within the image file, for example, using a TIFF IFD within an Exif image file. Alternatively, the classification data can be stored in a separate file, such as a "Favorites" file, that provides a list of all of the stored images that are classified as favorites.

Affective information can be manually entered by a user, for example, using pushbuttons, a touch screen, or voice recognition, or can be collected automatically, as described in commonly assigned U.S. patent application Ser. No. 10/304,037, entitled "Imaging Method and System for Health Monitoring and Personal Security" by Elena Fedorovskaya et al. the disclosure of which is incorporated herein by reference.

Referring to FIG. 1, there is illustrated a digital photography system in accordance with the present invention. As shown in FIG. 1, the system includes a digital camera 300 that captures and classifies still and motion video images, as will be described later with reference to FIG. 2. The digital camera 300 is one example of an imaging device that can be used in a digital photography system made in accordance with the present invention. Other examples of imaging devices include still-only or motion video-only cameras, and combination cell phone/digital cameras that can capture and transmit digital still and video images.

The digital photography system of FIG. 1 also includes a home computer system 10. The home computer 10 includes a CPU motherboard 12, having for example, an Intel Pentium IV processor as well as RAM memory (not shown). The CPU motherboard 12 executes software stored on a hard drive 20, for example, the well-known Windows XP operating system software and the Internet Explorer web browser software, both provided by Microsoft Corp. of Redmond, Wash. The hard drive 20 is also used to store application software that can be provided along with the digital camera 300 using any suitable software distribution media or method, such as a CD-ROM, floppy disc, or Internet download, as is well-known to those skilled in the art. As will be described later with reference to FIG. 3, the hard drive 20 is also used to store images downloaded from the digital camera 300 and to store a local database of information associated with these downloaded images. The hard drive 20 is one type of memory associated with the home computer 10. Other types of memory could alternatively be used with the home computer 10 to store downloaded images, such as solid-state Flash EPROM memory and optical read/write discs, such as recordable and erasable DVD discs.

The CPU motherboard 12 is coupled to a display monitor 14 and a keyboard 16. A mouse 18 permits the user to readily communicate with the CPU motherboard 12. The home computer 10 also includes a dial-up modem 22 for communicating with an Internet Service Provider (ISP) 30 in order to connect to a channel 36, such as the Internet, in order to email images to others, or to provide images to a service provider for storage and/or printing. The CPU motherboard 12 can communicate with the digital camera 300 when the digital camera 300 is placed in a dock 350. The communication uses a suitable wired or wireless interface, such as the well-known Universal Serial Bus (USB) interface. The dock 350 can be used to transfer images and control files to the home computer 10, to transfer images and information, such as camera settings and email addresses, from the home computer 10 to the digital camera 300, and to recharge the batteries in the digital camera 300.

The CPU motherboard 12 also communicates with a card reader 24, which can read and write data on a removable flash memory card 330 (shown in FIG. 2) used in the digital camera 300, which is an alternative way of transferring images and control files from the digital camera 300 to the home computer 10. The home computer 10 also includes a printer 26, which communicates with the CPU motherboard 12 over a suitable interface, such as the USB interface.

In alternative embodiments, other devices, such as a television set-top box or Internet appliance, could be used in place of the home computer 10. Also, the connection between the digital camera 300 and the home computer 10 could be done directly, without using dock 350.

The ISP 30, for example, Earthlink Network, Inc. of Pasadena, Calif., includes banks of modems 32, one of which is connected to communicate with the modem 22 of the home computer 10. The modem 32 in turn communicates with computers/routers 34 in order to provide a connection to the channel 36, which is preferably the Internet, using equipment and techniques well-known to those skilled in the art. The ISP 30 provides e-mail services using the channel 36.

An electronic auction provider 80 communicates over the channel 36 in order to enable a member, using a home computer 10, to upload information and images which describe and depict a product to be offered at an electronic auction, and for other members to bid on the product. An example of an electronic auction provider 80 is the well-known eBay "online marketplace", at www.ebay.com.

A photo service provider 40 communicates with a fulfillment system 50, which is comprised of one or more computers and associated peripherals for producing photo products, such as hardcopy prints, album pages, photo mugs, PictureCD discs, and the like. The fulfillment system 50 includes a computer that serves as a production controller 52, and controls one or more color printers 54, which can produce photo products 66 such as album pages or standard hardcopy prints. The hardcopy prints can be of various sizes, and can be sold in frames. The production controller 52 is also connected to a disc writer 76, which can produce CDs or DVDs, for example PictureCDs, having digital still and video images and application software for using the digital images. The production controller 52 can optionally be connected to devices (not shown) for producing other types of photo products 66, for example, t-shirts or coffee mugs, incorporating one or more images uploaded by the user. The production controller 52 also controls a shipping system 70, which controls a shipping label printer 72 to produce a shipping label 74. The shipping label 74 is attached to a shipping container (e.g., a cardboard box containing packing material) that contains and protects the photo product 66 during shipment (e.g., via air express mail or ground carrier) to the user or the user's designee.

A service provider database 44 at the photo service provider 40 provides information describing numerous photo products that can be provided by the fulfillment system 50, as described in commonly-assigned U.S. patent application Ser. No. 09/576,288, filed May 23, 2000, entitled "Method For Providing Customized Photo Products Over A Network" by Parulski et al., the disclosure of which is incorporated herein by reference. This includes information describing photo product options, for example, album features such as providing various background colors or textures, page numbers, page captions, and image captions. The album pages can be bound in a cover, or can include holes to permit the pages to be inserted into a standard binder, such as a three-ring binder. These album feature options can be demonstrated via software programs, for example, JAVA applets, MPEG or QuickTime movies, or Shockwave files, which depict the functionality of features that the customer can choose.

The service provider database 44 includes information describing each customer account, including user billing information. The billing information can include a payment identifier for the user, such as a charge card number, expiration date, and user billing address. The service provider database 44 can optionally provide long-term storage of the uploaded images for each user. In this case, stored images are accessible (e.g., viewable) via the Internet by authorized users, as described, for example, in commonly-assigned U.S. Pat. No. 5,760,917, entitled "Image Distribution Method and System" to Sheridan, the disclosure of which is herein incorporated by reference. The service provider database 44 can be provided by the same computer as a network server 42, or can utilize a separate computer, or can be distributed over several computers at the same physical site, or at different sites.

On a regular basis (e.g., monthly), or alternatively, whenever a photo product 66 is purchased by the user, the service provider database 44 communicates with a billing system 46 to verify that the payment identifier (e.g., credit card or debit card number) provided by the customer is valid, and to debit the account for the purchase or the monthly service fee for providing information to the user and storing user images. As shown in block 48, the bill is issued. The customer's account that is debited can, of course, be located at a remote financial institution.

Figure 2:
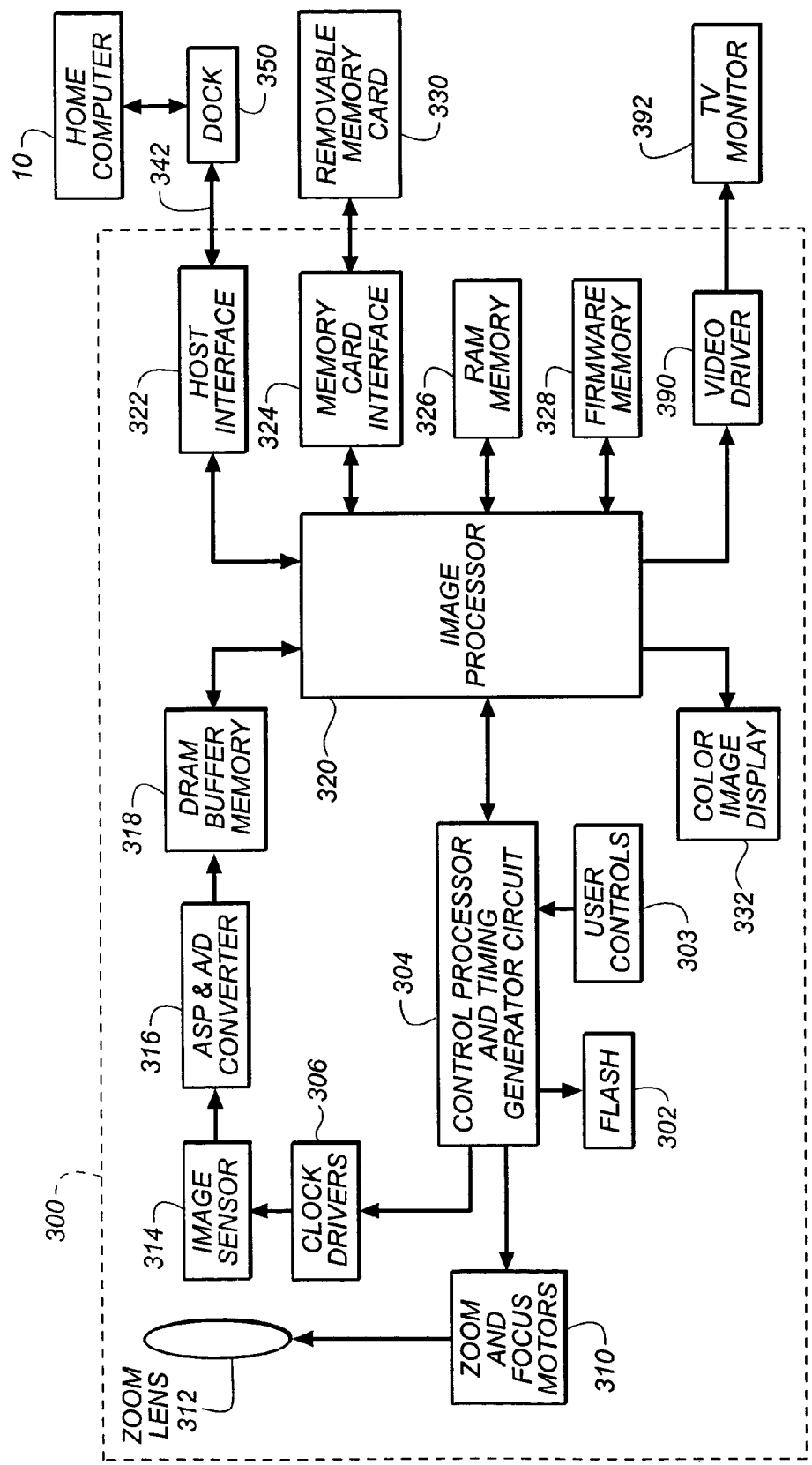
FIG. 2 depicts a block diagram of a digital camera used in the digital photography system of FIG. 1.
Figure 4:
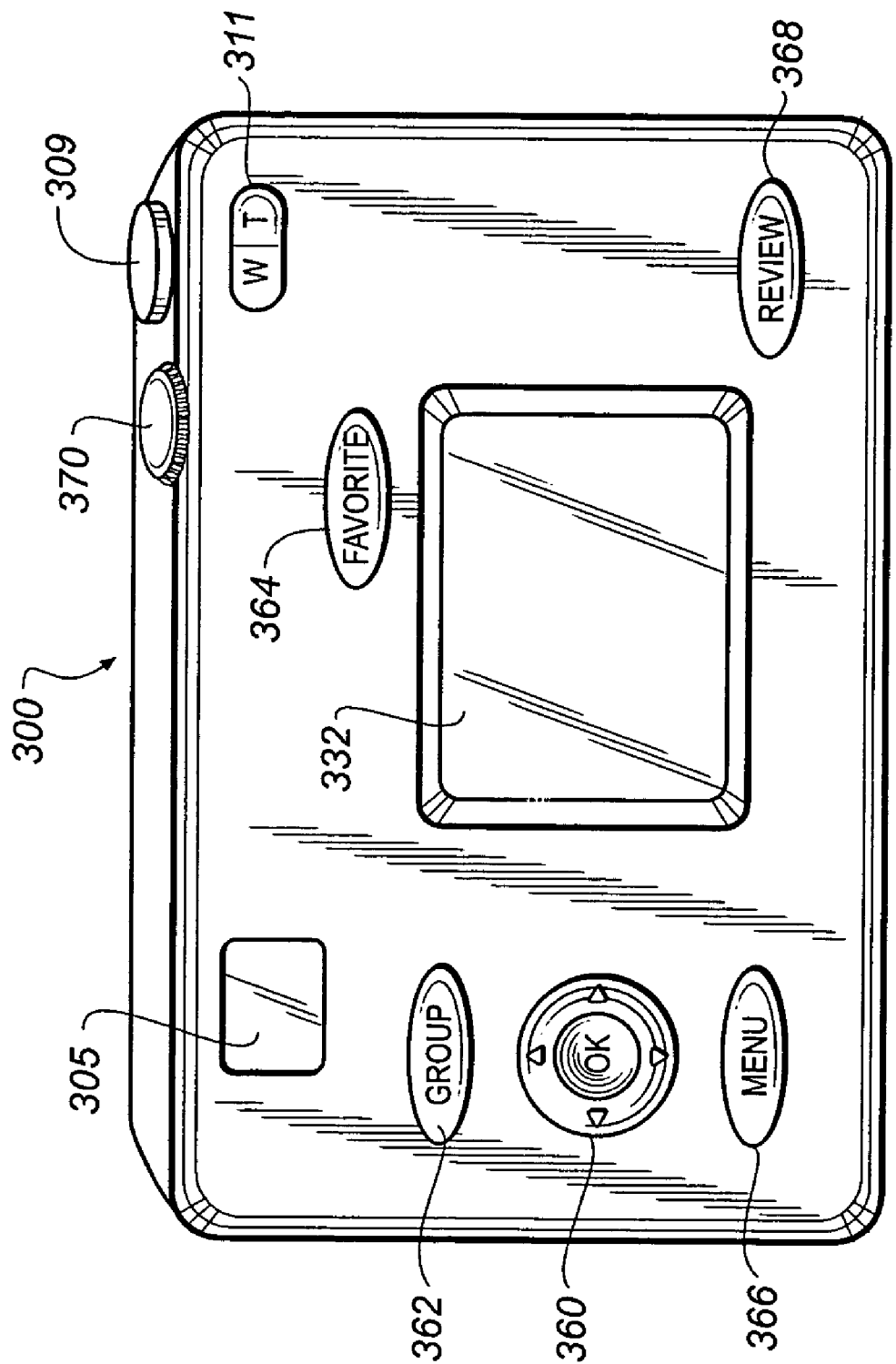
FIG. 4 depicts a rear view of the digital camera of FIG. 2.

The digital camera 300 is shown in block diagram form in FIG. 2. The back of the digital camera 300, which provides a camera user interface, is shown in FIG. 4. Preferably, the digital camera 300 is a portable battery operated device, small enough to be easily handheld by a user when capturing and reviewing images. The digital camera 300 can be, for example, a Kodak EasyShare DX4330 Zoom Digital Camera. The digital camera 300 produces digital images that are stored on the removable memory card 330. The digital camera 300 includes a zoom lens 312 having zoom and focus motor drives 310 and an adjustable aperture and shutter (not shown). Referring to FIG. 4, the user composes the image using an optical viewfinder 305 and a zoom lens control 311, and then depresses shutter button 309 to begin capture of a still image. Referring again to FIG. 2, zoom lens 312 focuses light from a scene (not shown) on an image sensor 314, for example, a single-chip color CCD image sensor, using the well-known Bayer color filter pattern. The image sensor 314 is controlled by clock drivers 306. The image sensor 314 can have, for example, 3.3 megapixels (2242×1473 pixels), of which the center 3.1 megapixels (2160×1400 pixels) are stored in the final image file after image processing. The zoom and focus motors 310 and the clock drivers 306 are controlled by control signals supplied by a control processor and timing generator circuit 304. The control processor and timing generator 304 receives inputs from an image processor 320, which provides calculations for focus and exposure determination, and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by an image processor 320 controlled by the firmware stored in firmware memory 328, which can be flash EPROM memory.

The processed digital image file is provided to a memory card interface 324, which stores the digital image file on the removable memory card 330. Removable memory cards 330 are one type of removable digital image storage medium, and are available in several different physical formats. For example, the removable memory card 330 can include memory cards adapted to the well-known PC card, Compact Flash, SmartMedia, MemoryStick, MMC or SD memory card formats. Other types of removable digital image storage media, such as magnetic hard drives, magnetic tape, or optical disks, can alternatively be used to store the digital images.

The processor 320 performs color interpolation followed by color and tone correction, in order to produce rendered sRGB image data. The processor 320 can also provide various image sizes selected by the user, for example, 3.1 megapixel (MP) "best quality" images, 2.2 MP "better quality" images, 0.8 MP "e-mail quality" images, and 0.4 MP "web quality" images. The rendered sRGB image data is then JPEG compressed and stored as a JPEG image file on the removable memory card 330. The JPEG file uses the so-called "Exif" image format defined in "Digital Still Camera Image File Format (Exif)" version 2.1, July 1998 by the Japan Electronics Industries Development Association (JEIDA), Tokyo, Japan. This format includes an Exif application segment that stores particular image metadata, for example, the date and time the picture was captured, the lens f/number and other camera settings, and image captions or comments that can be selected or entered by the camera user. In some embodiments of the present invention, this metadata can include metadata identifying favorite images and groups of images. In other embodiments, the favorites and grouping metadata is provided in a separate control file. The control processor and timing generator 304 also provide a real-time clock value to the image processor 320, which can stored this value as date/time metadata in each image file.

The processor 320 also creates a low-resolution "thumbnail" size image, which can be created as described in commonly-assigned U.S. Pat. No. 5,164,831, entitled "Electronic Still Camera Providing Multi-Format Storage Of Full And Reduced Resolution Images" to Kuchta, et al., the disclosure of which is herein incorporated by reference. In a preferred embodiment, this thumbnail image has 160×120 pixels, to conform to the DCF rules described later, and is stored in RAM memory 326 and supplied to a color LCD image display 332. After images are captured, they can be quickly reviewed on the color LCD image display 332 by using the thumbnail image data. The digital camera 300 can also include a video output driver 390 for displaying the captured images and the graphical user interface on a separate TV monitor 392.

The graphical user interface displayed on the color LCD image display 332 is controlled by user controls 303. In a preferred embodiment shown in FIG. 4, user controls 303 (see FIG. 2) include a joystick controller 360 that includes 4-way control (up, down, left, right) and a push-button center "OK" switch. User controls 303 further include a "group" push button 362, a "favorite" pushbutton 364, a "menu" pushbutton 366 and a "review" pushbutton 368 which are used when grouping and categorizing images. User controls 303 further include the zoom lens control rocker switch 311, the shutter button 309, and the mode dial 370, which sets various camera capture modes, such as auto mode, sports mode, night mode, landscape mode, close-up mode, and video capture mode. In alternative embodiments, many different types of user controls can be used.

As will be described later with reference to FIG. 3A, when the user presses the "review" button 368 (see FIG. 4), the last captured image is displayed on the color image display 332. The user can display other images by pressing the left and right arrows of joystick controller 360. The user can press the "favorite" button 364 to tag the displayed image as a favorite image. The user can press the "group" button 362 to indicate the beginning of a new group of images.

As shown in FIG. 2, an interface 342 can be used to connect between the host interface 322 in the digital camera 300 and the dock 350, which connects to the home computer 10. The interface 342 may conform to, for example, the well-known USB interface specification. Alternatively, the interface between the digital camera 300 and the home computer 10 can be a wireless interface, such as the well-known Bluetooth wireless interface or the well-known 802.11b wireless interface. The interface 342 can be used to download images from removable memory card 330 to the home computer 10, instead of using card reader 24 (FIG. 1). The interface 342 can also be used to transfer data from the home computer 10 to the firmware memory 328 in the digital camera 300. In particular, it can be used to transfer a user name and e-mail addresses from the home computer 10 to the firmware memory 328, as described in commonly-assigned U.S. patent application Ser. No. 08/977,382, filed Oct. 18, 2002, the disclosure of which is herein incorporated by reference.

Figure 5:
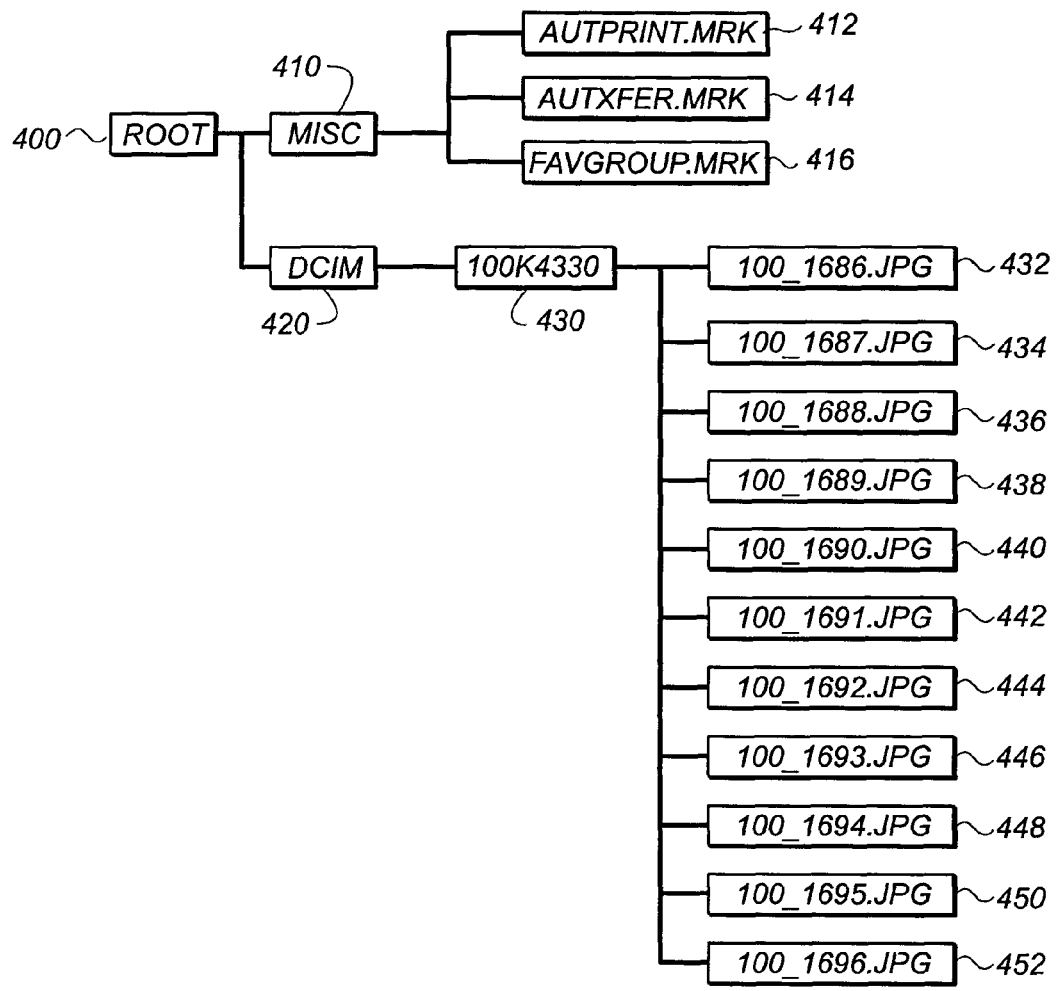
FIG. 5 depicts a directory structure for images and control files stored by the digital camera of FIG. 2.

FIG. 5 depicts an exemplary directory structure recorded on the removable memory card 330 by the digital camera 300. The Exif image files, containing the JPEG compressed main image, thumbnail image, and the image metadata, are stored on the removable memory card 330 using a directory structure conforming to the so-called "DCF" rules defined in "Design Rule For Camera File System" version 1.0, December 1998 by the Japan Electronics Industries Development Association (JEIDA), Tokyo, Japan. Two directories are recorded under a root directory 400. The first is a MISC directory 410 containing a control file 412 named AUTPRINT.MRK, a control file 414 named AUTXFER.MRK, and a control file 416 named FAVGROUP.MRK. Control files 412 and 414 are DPOF files which specify images to be printed and emailed, as described in commonly-assigned U.S. patent application Ser. No. 10/081,255, filed Feb. 22, 2002, entitled "Image Application Software Providing A List Of User Selectable Tasks" to Herbert, the disclosure of which is herein incorporated by reference.

The second directory recorded under root directory 400 is DCIM directory 420, which contains a subdirectory 430. The subdirectory 430 is named 100K4330, to conform to the DCF rules, and contains eleven JPEG compressed Exif image files, file 432 named 100_1686.JPG, file 434 named 100_1687.JPG, file 436 named 100_1688.JPG, file 438 named 100_1689.JPG, file 440 named 100_1690.JPG, file 442 named 100_1691.JPG, file 444 named 100_1692.JPG, file 446 named 100_1693.JPG, file 448 named 100_1694.JPG, file 450 named 100_1695.JPG, and file 452 named 100_1696.JPG. Files 432 through 452 are Exif image files captured by the digital camera 300.

FIG. 6 is an example of the contents of FAVGROUP.MRK file 416. The file includes a header section (lines 1-4) having a header identifier ("HDR" in line 1), which identifies the make and model of the digital camera that created the file (Kodak DX4330 zoom digital camera in line 2), the serial number of the camera (GEN SRN=00100245 in line 3) and the time that the file was created (line 4). The file also includes six "JOB" sections, each of which designates either an image which is the first sequential image of a "group" of images, or a "favorite" image.

Lines 5 through 8 define a group job. The group job is identified as the first group job (GRP PID=001 in line 6). The next two lines indicate that the Exif format image (line 7), which is named 100_1686.JPG (image file 432 in FIG. 5) within subdirectory 100K4330 within directory DCIM (as indicated by line 8), is the first image of a first group of images.

Similarly, lines 9 through 12 define another group job. The group job is identified as the second group job (GRP PID=002 in line 10). The next two lines indicate that the Exif format image (line 11), which is named 100_1689.JPG (image file 438 in FIG. 5) within subdirectory 100K4330 within directory DCIM (as indicated by line 12), is the first image of a second group of images. Therefore, all of the images since the last group job are included in the previous group. In other words, image files 432 through 436 in FIG. 5 are included in the first group, and image file 438 is the first image of the second group.

Likewise, lines 13 through 16 define another group job. The group job is identified as the third group job (GRP PID=003 in line 14). The next two lines indicate that the Exif format image (line 15), which is named 100_1693.JPG (image file 446 in FIG. 5) within subdirectory 100K4330 within directory DCIM (as indicated by line 16), is the first image of the third group of images.

Thus, the three group jobs in lines 5 through 16 indicate that image files 432 through 436 in FIG. 5 form a first group of images, image files 438 through 444 form a second group of images, and image files 446 through 452, which is the last image, form a third group of images.

Lines 17 through 20 define a favorite image. The image is identified as the first favorite image (FAV PID=001 in line 18). The next two lines indicate that the Exif format image (line 19), which is named 100_1687.JPG (image file 434 in FIG. 5) within subdirectory 100K4330 within directory DCIM (as indicated by line 20), is the favorite image.

Lines 21 through 24 define another favorite image. The image is identified as the second favorite image (FAV PID=002 in line 22). The next two lines indicate that the Exif format image (line 23), which is named 100_1691.JPG (image file 442 in FIG. 5) within subdirectory 100K4330 within directory DCIM (as indicated by line 24), is the favorite image.

Lines 25 through 28 define another favorite image. The image is identified as the third favorite image (FAV PID=001 in line 26). The next two lines indicate that the Exif format image (line 27), which is named 100_1695.JPG (image file 450 in FIG. 5) within subdirectory 100K4330 within directory DCIM (as indicated by line 28), is the favorite image.

It will be understood by those skilled in the art that the FAVGROUP.MRK file 416 in FIG. 5 could have used alternative ways of indicating which images belong to different groups. For example, all of the images in a particular group could be listed, or the first and last images of a group could be listed.

In alternative embodiments, the data indicating favorite images and groups of images can be added within each image file, so that a separate control file is not necessary. In other alternative embodiments, the data identifying groups of images can be provided by storing each group of images within a separate subdirectory according to the DCF rules. In such embodiments, only the first group of images is stored in subdirectory 430, named "100K4330" in FIG. 5, and the other groups of images are stored in other subdirectories (not shown) named "101K4330" for the second group, "102K4300" for the third group, and the like.

Figure 3A:
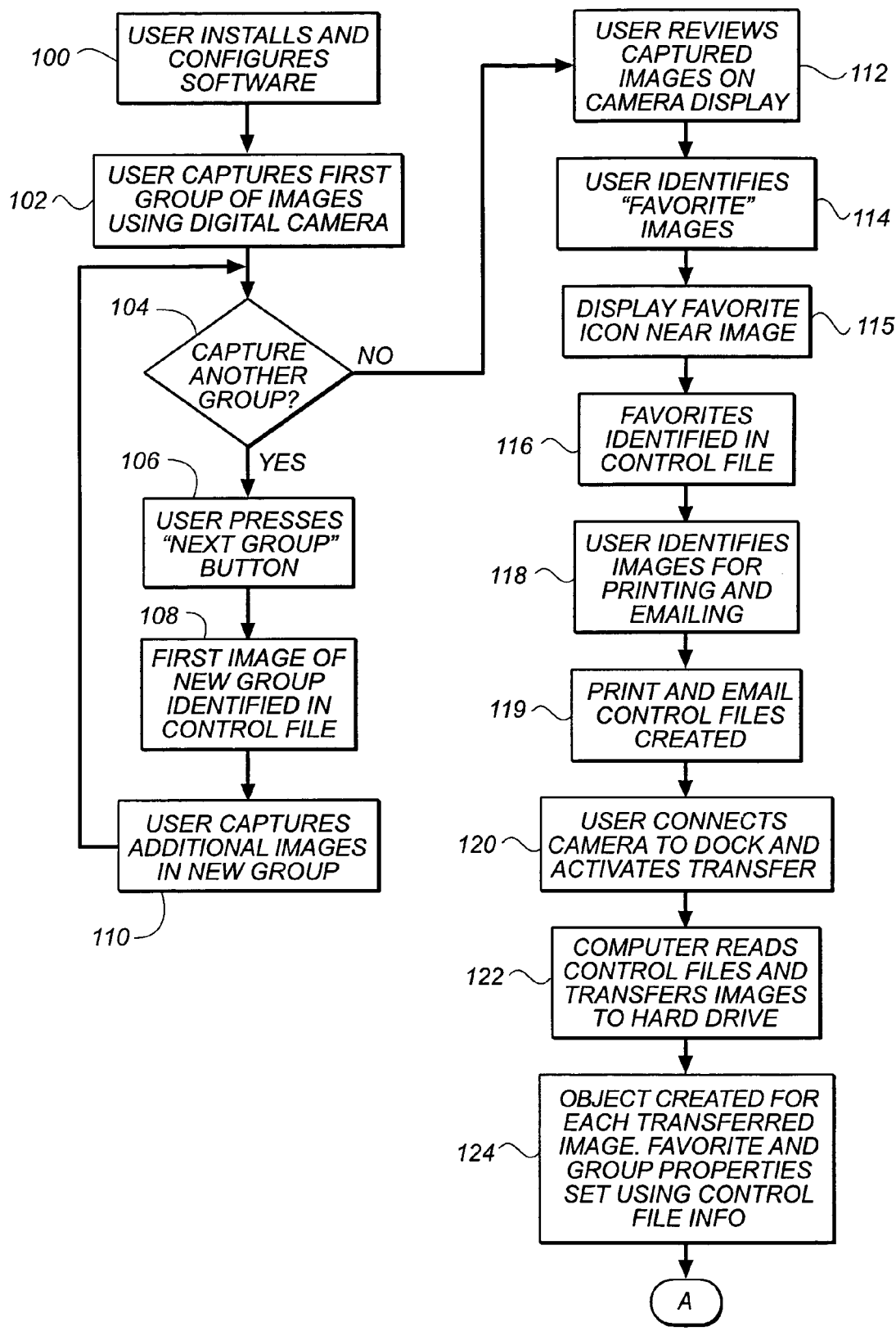
FIGS. 3A and 3B, taken together, depict a flow diagram showing a first embodiment of a method for grouping images, identifying favorite images, and organizing the images in accordance with the present invention.
Figure 3B:
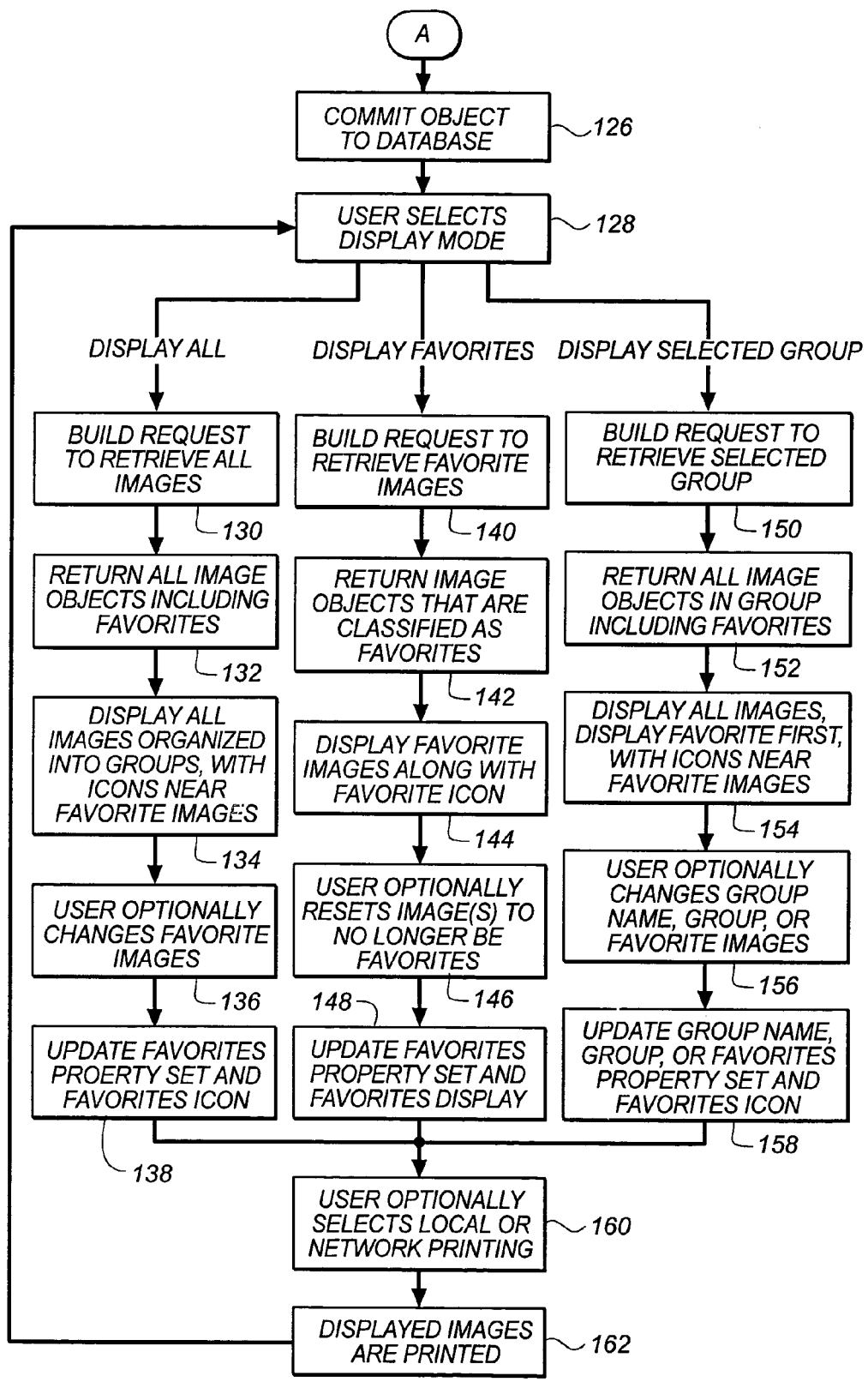

FIG. 3A and 3B, taken together, depict a flow diagram showing a first embodiment of a method in accordance with the present invention for grouping images, identifying favorite images, and organizing the images, implemented using the system described earlier in relation to FIG. 1 and FIG. 2.

In block 100 of FIG. 3A, the user installs the software on the home computer 10. The installation creates a local database structure on the hard drive 20 of the home computer 10, as will be described later with reference to FIG. 8. This local database will later be populated with data which groups and classifies the images which are captured by the digital camera 300 and transferred to the home computer 10.

In some embodiments of the present invention, the software on the home computer 10 can be used to customize on or more components of the firmware stored in the firmware memory 328 of the digital cameras 300, as described in commonly-assigned U.S. patent application Ser. No. 09/549,356, filed Apr. 14, 2000, entitled "CUSTOMIZING A DIGITAL CAMERA" to Prabhu et. al., the disclosure of which is herein incorporated by reference.

In a preferred embodiment, when the software is initially installed on the home computer 10, the user is prompted to answer a number of questions in order to produce a personalized database of metadata "labels", as described in commonly-assigned U.S. patent application Ser. No. 09/721,222, filed Nov. 22, 2000, entitled "Method For Adding Personalized Metadata To A Collection Of Digital Images" to Parulski et. al., the disclosure of which is herein incorporated by reference.

In a preferred embodiment, the software also enables the user to create an e-mail address book on the home computer 10 and to transfer the e-mail addresses to the digital camera 300, as described in commonly-assigned U.S. patent application Ser. No. 10/081,255, filed Feb. 22, 2002, entitled "Image Application Software Providing A List Of User Selectable Tasks" to Herbert, the disclosure of which is herein incorporated by reference.

In block 102 of FIG. 3A, a group of digital images, which can be one or more images, is captured using the digital camera 300 and stored as digital image files on the removable memory card 330, as was described earlier with reference to FIG. 2. The images are stored using the directory structure shown in FIG. 5. For example, when the user depresses the shutter button 309 (see FIG. 4), a first digital image is captured and stored as an image file, such as image file 432 in FIG. 5. This first image file is the first image in a new group of images. Therefore, the image processor 320 in the digital camera 300 creates an initial FAVGROUP.MRK file (416 in FIG. 5) containing a single group job that indicates that this first image file 432, named 100_1686.JPG, is the first image of a new group of images. This can be done by writing lines 1 through 8 of the FAVGROUP.MRK control file shown in FIG. 6. The user continues to capture additional images in the first group, corresponding to image files 434 through 436 in FIG. 5.

In block 104, the user decides whether or not to capture another group of images. This next group can be of a different subject (e.g., a different person) than the first group or a different event, or can be taken for a different purpose. If yes to block 104, in block 106 the user presses the "group" button 362 on the digital camera 300 (see FIG. 4) to indicate that next images to be captured should be organized into a second group. Providing a single button, or a similar easy to operate user control, enables the camera user to quickly and easily organize images into different groups while taking pictures with the digital camera 300. These groups of images can later be assigned labels when they are transferred to the home computer 10.

In block 108, the image processor 320 in the digital camera 300 updates the initial FAVGROUP.MRK control file (416 in FIG. 5) to identify a second group of images. This is done after the user presses the shutter button 309 (see FIG. 4) to capture and store the next digital image (e.g., image file 438 in FIG. 5), by appending a second group job indicating that this image is the first image of a second group of image files. In this example, this is done by writing lines 9 through 12 of the FAVGROUP.MRK file shown in FIG. 6. In block 110, the user continues to capture additional images in the second group, corresponding to image files 440 through 444 in FIG. 6.

Returning to block 104, the user again decides whether to capture another group of images. If yes to block 104, block 106 through 110 are repeated, for example, to capture and store image files 446 through 452 in FIG. 5 and to create the third group job indicated by lines 13 through 16 of the FAVGROUP.MRK file shown in FIG. 6.

In an alternative embodiment, the digital camera 300 includes a microphone, and the user records a single audio annotation for the group of images as the user presses and holds the "group" button 362 (see FIG. 4). This audio annotation is stored as a separate audio file, such as a wave file, on the removable memory card 330. The audio annotation could describe the subject of the group of photos, or other information common to the group of photos. The FAVGROUP.MRK control file could include the name of this separate audio file created for each group.

Figure 7A:
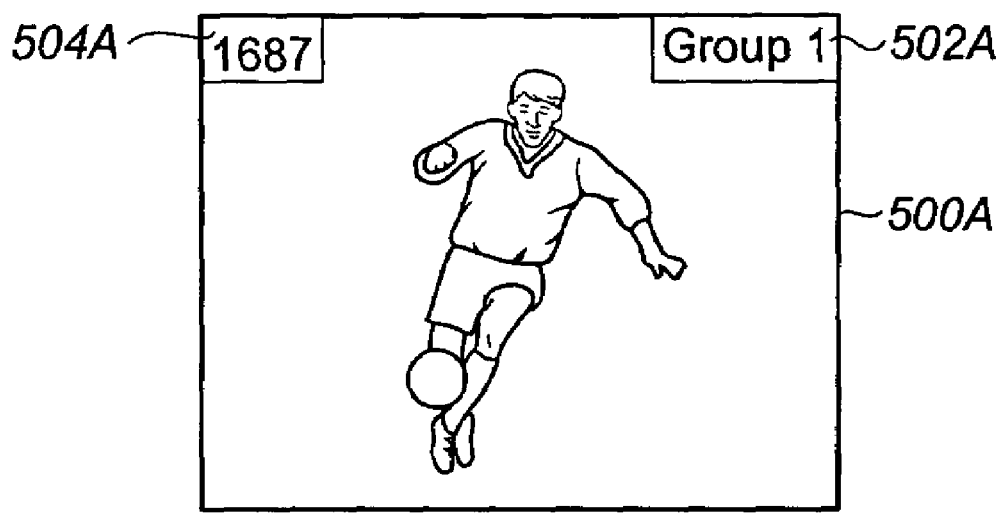
FIGS. 7A-7B depict digital camera graphical user interface screens for indicating groups of images and favorite images.

If in block 104 the user decides not to capture additional groups of images (no to block 104), in block 112 the user can review captured images on the color image display 332 of the digital camera 300. The review mode is initiated when the user presses the review button 368 (see FIG. 4). The last captured image file (e.g., file 452 in FIG. 5) is displayed. The user can navigate to review other image files (e.g., files 432 through 450) using the joystick controller 360. The images are initially displayed as shown in FIG. 7A, which shows the GUI screen 500A which is displayed on the color LCD display 332 of the digital camera 300 (see FIG. 2). The GUI screen 500A shows the image from the image file along with a display area 502A that indicates the group (e.g., Group 1) and a display window 504A that gives the image file number (e.g., number 1687).

Figure 7B:
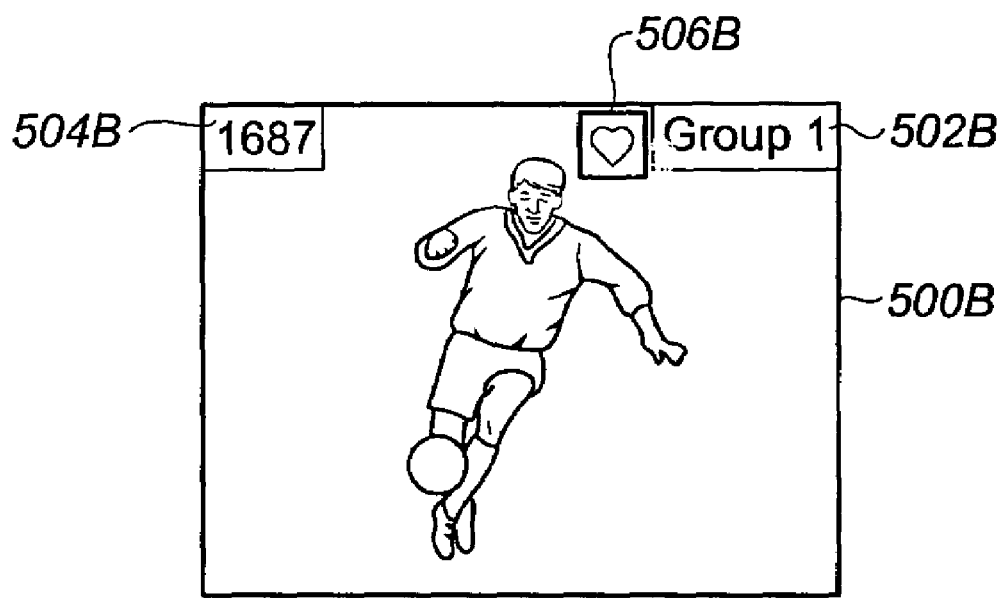

In block 114 of FIG. 3A, the user identifies one or more images as "favorite" images. The user accomplishes this by pressing the "favorite" button 364 (see FIG. 4) while the favorite image is displayed. In block 115, after the user presses the "favorite" button 364, the image processor 320 in the digital camera 300 updates the GUI screen displayed on the color LCD display 332 to be as shown in FIG. 7B. The GUI screen 500B in FIG. 7B includes a "favorite" indicator 506B, for example, the heart shaped icon shown in FIG. 7B. In block 116, the image processor 320 in the digital camera 300 updates the FAVGROUP.MRK control file shown in FIG. 6 to indicate that the image has been identified as a favorite image. For example, lines 17-20 are appended to the file to indicate that image file 434 in FIG. 5 named 100_1687.JPG is a favorite image. The user can identify additional favorite images in blocks 112-116 of FIG. 3A, such as image files 442 and 450, which are identified in lines 21 through 28 in FIG. 6.

In an alternative embodiment, the digital camera 300 includes a user interface which enables the user to identify images as being an "Extra Favorite" image, a "Favorite" image, a "Normal" image, or a "Dislike" image, and to change the classification of a previously classified image. In this case, an appropriate icon is used to indicate the image classification. In another alternative embodiment, the digital camera 300 includes a slide show mode which automatically cycles to sequentially display only images classified as "favorite" or "extra favorite".

In block 118, the user can optionally select image for printing and e-mailing, as described in commonly-assigned U.S. patent application Ser. No. 10/081,255 filed Feb. 22, 2002, entitled "Image Application Software Providing A List Of User Selectable Tasks" to Herbert, the disclosure of which is herein incorporated by reference, and corresponding print and email control files are created in block 119.

In block 120, the user connects the digital camera 300 to the dock 350, which is connected to the home computer 10 via an interface such as USB, and presses a "transfer" button (not shown) to initiate the image transfer. This transfer takes place using the commands defined in the industry standard PIMA 15740:2000 entitled "Photography—Electronic still picture imaging—Picture transfer protocol (PTP) for digital still photography devices", which is available from the International Imaging Industries Association (I3A) in Harrison, N.Y. Alternatively, the user can remove the removable memory card 330 from the digital camera 300 and place the removable memory card 330 in the card reader 24.

In block 122, the home computer 10 reads the control files 412-416 and transfers the image files 432-452 (see FIG. 5) to the hard drive 20 of the home computer 10. The image files are stored in a default directory, such as in a "my collection" directory, or in a directory selected by the user when the software was installed in block 100. In block 124, an object is created for each transferred image, and the favorite and group properties of each object are set to correspond to the information read from the control file in block 122. In block 126 shown in FIG. 3B, the object created for each transferred image is committed to the local database stored on the hard drive 20 of the home computer 10. It will be understood that while in a preferred embodiment, the local database stores objects in an object oriented database management system (OODBMS). In alternative embodiments, the local database can use many different types of more primitive data structures, including arrays, tables, lists, registries, and the like, to store the data identifying favorite images and groups of images.

Figure 8:
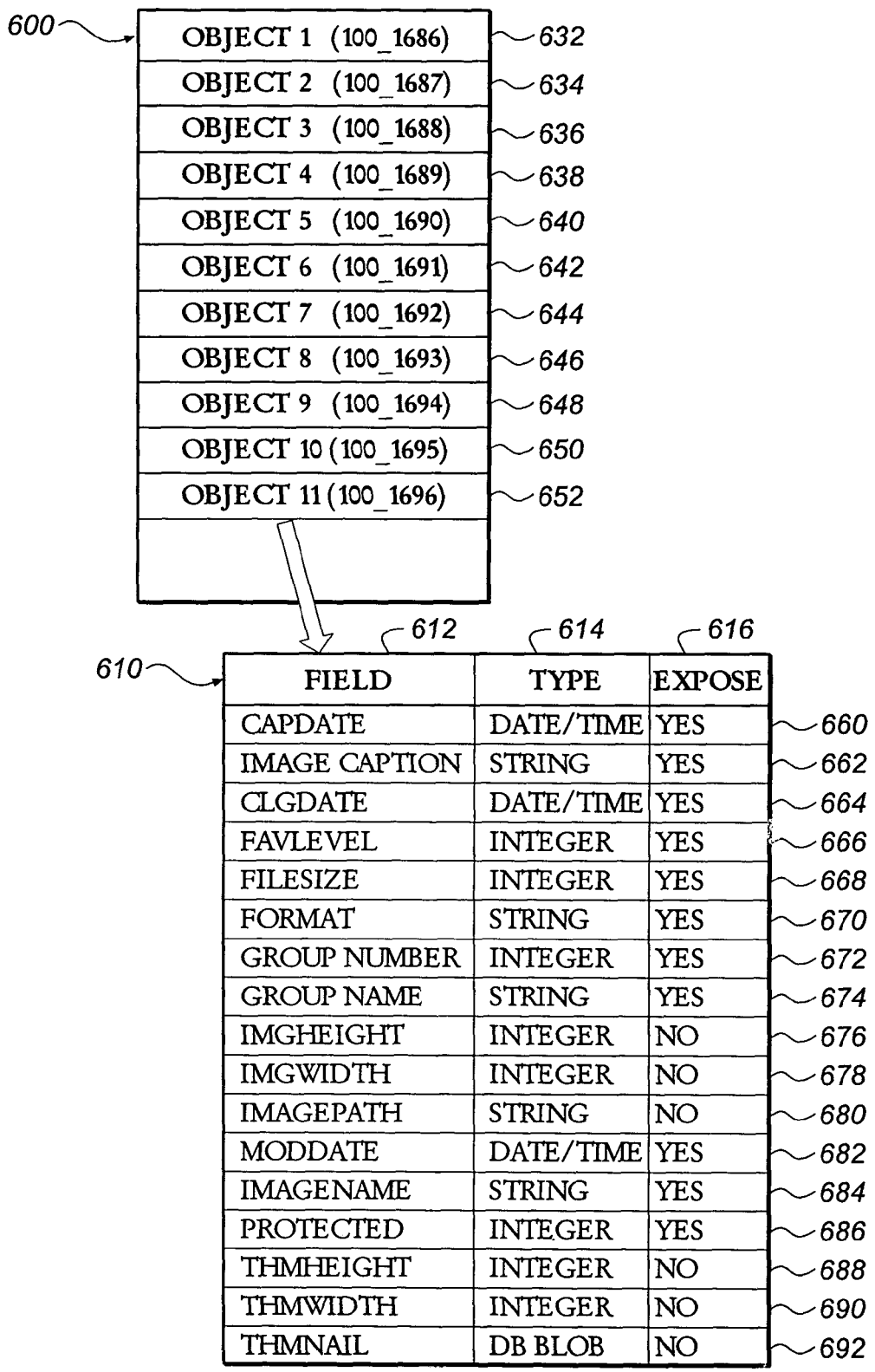
FIG. 8 depicts information included in the local database.

FIG. 8 depicts information included in the local database stored on the hard drive 20. The database includes a general assets table 600 that includes an image data object 632-652 for each transferred image. In particular, there are 11 data objects which correspond to the 11 image files 432-452, named 100__1686 through 100__1696 shown in FIG. 5.

Each image data object, for example "object 11 (100__1696) 652, which corresponds to the image file 452 named 100__1696 in FIG. 5, includes the table of data fields 610. Each row 660-692 of the table 610 includes a particular type of metadata describing the image. The metadata in the database is preferably stored using XML. Each row of the table 610 includes a field 612 in the first column which names the metadata item (e.g., capdate for image capture date), a type 614 in the second column which indicates the type of data (e.g., string for character string), and an "expose" value 616 in the third column which indicates whether this particular metadata is exposed to the user of the software application.

The "capdate" metadata in row 660 provides the date/time that the image was captured using the digital camera 300. The "image caption" metadata in row 662 provides user entered caption. This metadata is null until the caption is optionally entered by the user using the keyboard 16 (see FIG. 1). The "clgdate" metadata in row 664 provides the date/time that the image was cataloged, in other words, the date/time that the object was committed to the database in block 126 of FIG. 3B. The "favlevel" metadata in row 666 indicates whether or not the image was selected as a favorite in block 114 of FIG. 3A. As described earlier, images are classified using a scale ranging between −10 and +10. If the image was not selected as a favorite in block 114, it is given a value of 0, and if it was selected as a favorite, it is given a value of +7. The other values can be used to enable images to later be reclassified as "more favorite" or "less favorite".

The "filesize" metadata in row 668 and "format" metadata in row 670 of FIG. 8 indicate the size and type of image file (e.g., JPEG, TIFF, etc.). The "group number" metadata in row 672 gives the number of the group of images (e.g. 1, 2, 3, etc.) that this particular image is part of. The group job information in the FAVGROUP.MRK file 416 is used to determine the group number. The "group name" metadata in row 672 gives an optional name for the group, as will be discussed later with reference to block 156.

The "imgheight" and "imgwidth" metadata in rows 676-678 give the size of the image stored in the image file, and the "imagepath" metadata in row 680 provides the pathname to the image file which was stored on hard drive 20 when the images were transferred as part of block 122 of FIG. 3A. The "moddate" metadata in row 682 indicates the date/time that the image last modified, or the date that the image was captured, if it has never been modified. The "imagename" metadata in row 684 indicates the name of the image file (e.g. 100__1696 for image data object 652). The "protected" metadata in row 686 indicates whether or not this image file has been protected by the user via the operating system.

The "thmheight" and "thmwidth" metadata in rows 688-690 give the size of the thumbnail image (e.g., 160×120 pixels) and the "thmnail" metadata in row 692 is a data blob which holds a copy of the compressed thumbnail image that was stored by the digital camera 300 in each Exif image file. Providing a copy of each thumbnail image in the general assets table 600 of FIG. 8 allows all of the thumbnails to be quickly retrieved from the hard drive 20 for display on the display monitor 14 (see FIG. 1).

In block 128 of FIG. 3, the user selects a display mode, and the appropriate transferred images are displayed. The user can select a display of "all images", a display of "all favorite" images, or a display of a "selected group" of images. If the user selects the "display all" option, in block 130 the CPU motherboard 12 in the home computer 10 builds a request to retrieve all of the thumbnail images from the general assets table 600 in FIG. 8. In block 132 all of the image objects are retrieved, which includes the "favlevel" favorites level metadata 666. In block 134 all of the images are displayed in a way that organizes them into groups, with icons indicating the favorite images in the collection of images.

Figure 9A:
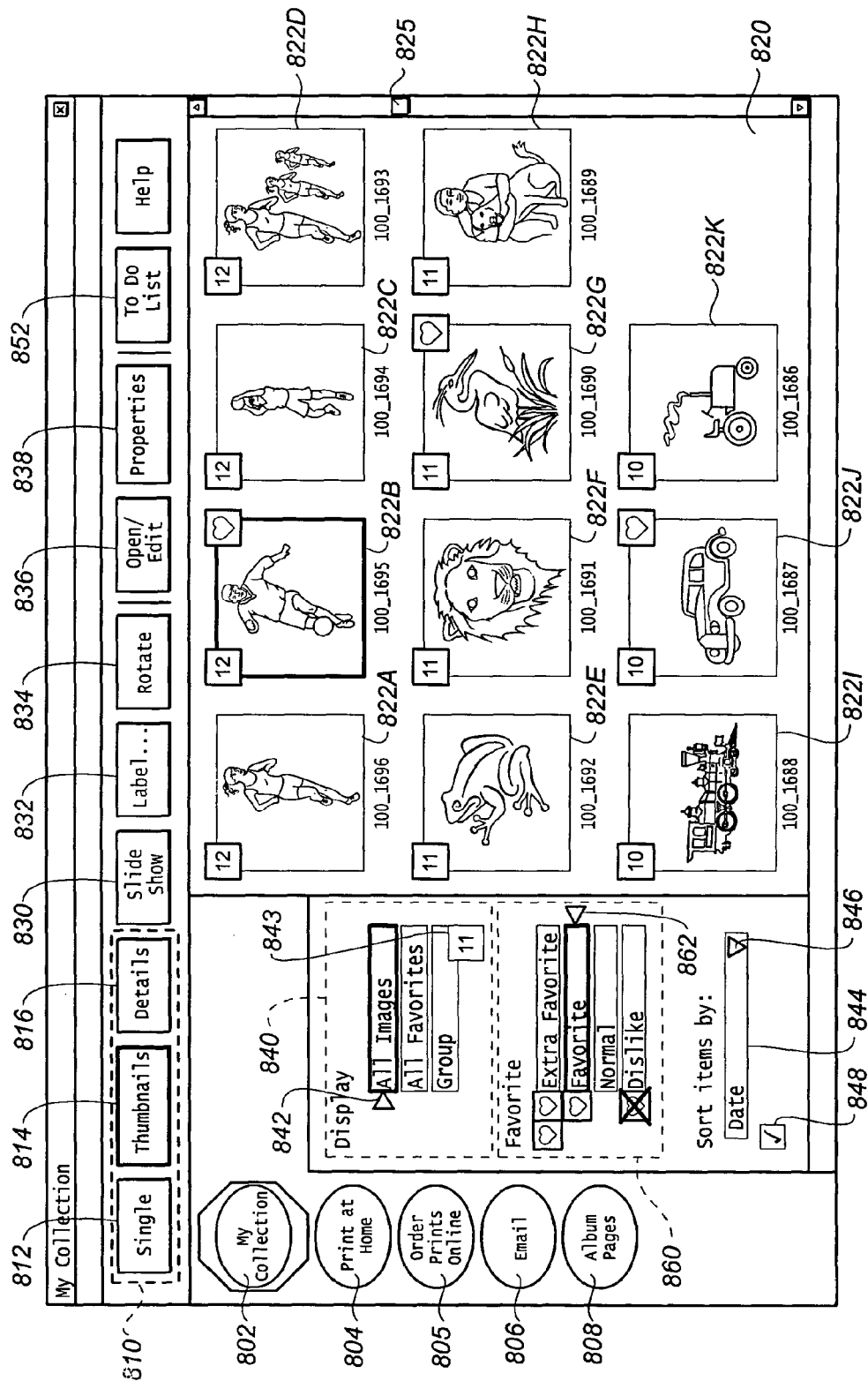
FIGS. 9A-9C depict computer user interface screens for displaying transferred images.

FIG. 9A depicts an example of a computer user interface screen for displaying all of the transferred images. A GUI screen 800A includes an area 820 for displaying the thumbnail images provided using the "thmnail" metadata 692 of each object in the general assets table 600 in FIG. 8. By moving a selector 842 within a display selection area 840, the user can select a display of "All Images", a display of "All Favorites", or a display of a "Group" of images selected using a group number/name box 843". In the example of FIG. 9A, the "All Images" display mode is selected.

The GUI screen 800A also includes a display format selection area 810, which provides three types of display formats. A "Thumbnails" display icon 814 displays an array of thumbnails in the image display area 820, as shown in the example of FIG. 9. Alternatively, a "Single" display icon 812 can be selected by the user in order to display a single image at a time in the image display area 820, or a "Details" display icon 816 can be selected by the user in order to display thumbnails and other information (including the capture date/time metadata indicating when the picture was taken, group number/name, and the like) in the image display area 820. Since the "Thumbnails" display mode has been selected the example shown in FIG. 9A, a group of thumbnail images 822A-822K are displayed in the image display area 820. A slider 825 is used for scrolling through the collection of thumbnail images. Beneath each thumbnail image 822A-822K is the image name, provided using the "imagename" metadata 684 in FIG. 8.

Adjacent the top left of each thumbnail image 822A-822K is a text box indicating the group to which the image belongs (e.g., group 12 for image 100__1696). The group number is provided by the "group number" metadata 672 in FIG. 8. This number is incremented for each group of images identified in a FAVGROUP.MRK file 416. Thus, the group containing the image named 100__1696 was the 12$^{th}$ group created by the digital camera 300 and transferred to the home computer 10.

Adjacent the top right of thumbnail images 822B, 822G, and 822J is an icon including an object indicating a favorite image, since these particular images have been identified as favorites by the user in block 114 of FIG. 3 and therefore have a "favlevel" metadata 666 value of +7. In the example shown in FIG. 9A, the object in the icon which is used to identify thumbnail images 822B, 822G, and 822J as favorite images is a heart. It would be understood to those skilled in the art that a different object, such as a smiley face, a checkmark, or a star, could be used to identify an image as a favorite image. As will be described later, a most favorite image can be indicated with an icon having multiple copies of the same object, for example, two hearts or two stars. Alternatively, the object could be larger for an extra favorite image, or could be bolded or represented in a different color.

The GUI screen 800A also includes a "Slide Show" icon 830 for initiating a slide show of the images displayed in the image display window 820. One or more images can be labeled with one or more key words using a "Label" icon 832. The keywords can indicate the event or subject of the picture, for example. Selected images can be rotated by selecting a "Rotate" icon 834 or edited (e.g., by cropping, removing red-eye, changing the brightness, etc.) by selecting an "Open/Edit" icon 836. Information contained in a selected Exif image file (such as the date/time, camera settings and the like), as well as the keywords, can be viewed by selecting a "Properties" icon 838.

The GUI screen 800A also includes sort options that are selected using a sort items text box 844 and a pull-down arrow icon 846 to select a desired sort option from a list, including sort by date, caption, or keyword. A reverse order checkbox 848 is used to reverse the display of the thumbnail images.

The GUI screen 800A also includes tabs 802-810 for selecting other GUI screens. Tab 802 selects the "My Collection" (current) GUI screen, tab 804 selects a "Print at Home" GUI screen, tab 805 selects the "Order Prints Online" GUI screen, tab 806 selects the "Email" GUI screen, and tab 801 selects the "Album Pages" GUI screen.

In block 136 of FIG. 3B, the user optionally changes which images are favorites. This is done by using a favorites level selection area 860 shown in FIG. 9A. The user first selects one of the thumbnail images (e.g., thumbnail image 822B), and the favorites level selection area 860 then displays the current favorites level. If the user has not previously modified the level, the images are either "Normal" or "Favorite". Using the selector 862, the user can change the level of the selected image to be an "Extra Favorite", a "Favorite", a "Normal" image, or a "Dislike" image.

In block 138 of FIG. 3B, the favorites metadata is updated in the general assets table 600 to be +10 if the image has been set to be an "Extra Favorite", +7 if the image has been set to be a "Favorite", 0 if the image has been set to "Normal", and −7 if the image has been set to be "Dislike". The icon displayed next to each thumbnail image is also updated to reflect the level selected by the user. For example, if an "Extra Favorite" level has been selected, a double heart icon is displayed, if a "Favorite" level has been selected, a single heart icon is displayed, if a "Normal" level has been selected, no icon is displayed, and if a "Dislike" icon has been selected, a crossed out heart icon is displayed.

If in block 128 the user selects the "Display Favorites" option, for example, by selecting the "All Favorites" option using selection window 840 in FIG. 9A, in block 140 the CPU motherboard 12 in the home computer 10 builds a request to retrieve only those thumbnail images which correspond to favorite and extra favorite images from the general assets table 600 in FIG. 8. In block 142, all of the image objects classified as favorites are retrieved. In block 144, all of the favorite image thumbnails are displayed, with icons indicating the favorite level.

Figure 9B:
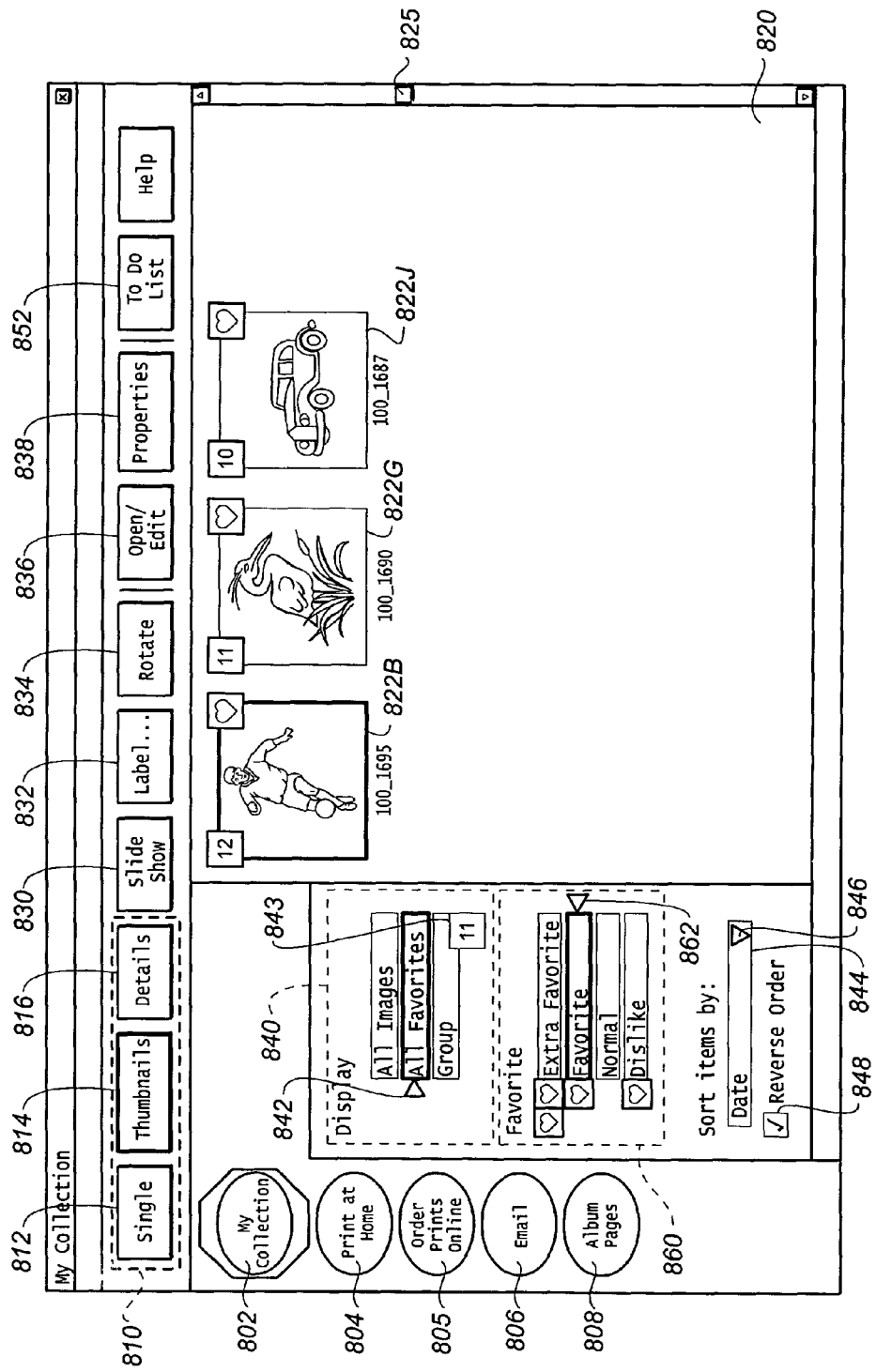

FIG. 9B depicts an example of a computer user interface screen for displaying all of the favorite images. A GUI screen 800B displays in area 820 the thumbnail images 822B, 822G and 822J that correspond to favorite images.

In block 146 of FIG. 3B, the user optionally resets images that are no longer considered favorites. This is accomplished using the favorites level selection area 860. The user first selects one of the thumbnail images (e.g., thumbnail image 822B), and the favorites level selection area 860 then displays the current favorites level. If the user has not previously modified the level, the images are either "Normal" or "Favorite". Using the selector 862, the user can change the level of the selected image to be an "Extra Favorite", a "Favorite", a "Normal" image, or a "Dislike" image.

In block 148, the favorites metadata is updated in the general assets table 600, and the icon displayed next to each thumbnail image is also updated, as was described earlier in relation to block 138.

If in block 128 the user selects the "Display Selected Group" option, for example by selecting the "Group" option using selection window 840 in FIG. 9B, in block 150 the CPU motherboard 12 in the home computer 10 builds a request to retrieve only those thumbnail images which correspond to the selected group (e.g., group number 11) from the general assets table 600 in FIG. 8. In block 152, all of the image objects belonging to the selected group are retrieved, along with the metadata indicating the favorites level. In block 154, all of the image thumbnails in the group are displayed, with icons indicating the favorite level.

Figure 9C:
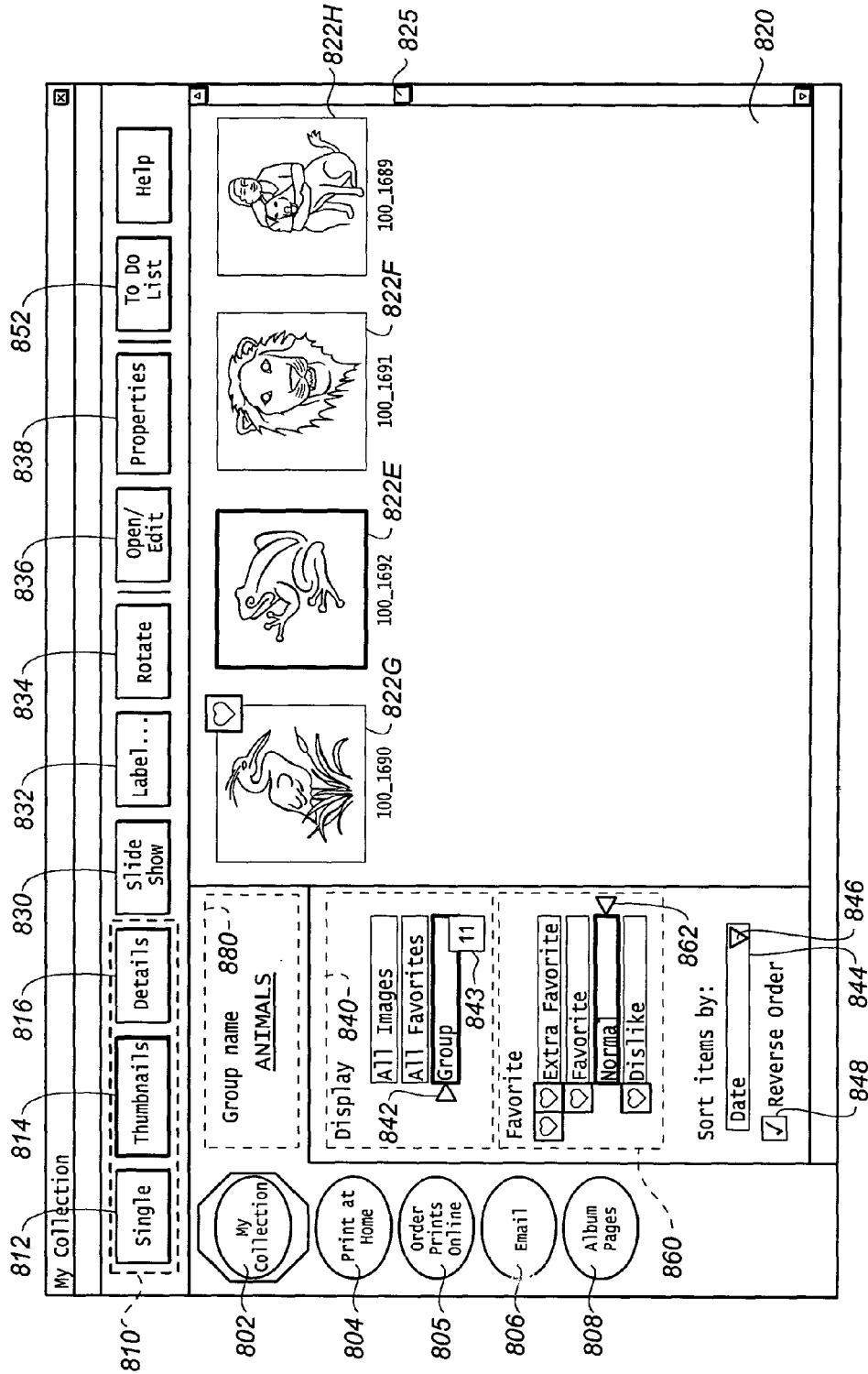

FIG. 9C depicts an example of a computer user interface screen for displaying all of the favorite images. A GUI screen 800C displays in area 820 the thumbnail images 822E, 822F, 822G and 822H that belong to the selected group.

In block 156 of FIG. 3B, the user optionally sets or changes the name of the group. This is done using naming window 880, by typing in an appropriate name (e.g., "ANIMALS") in the underline area. The user can also change the favorites level of one or more images as was described earlier in relation to block 136. In block 158, the favlevel metadata 666 and group name metadata 674 are updated in the general assets table 600, and the favorites level icon displayed next to each thumbnail image is also updated, as was described earlier in relation to block 138.

In block 160, the user optionally selects local or network printing, by selecting the "Print at Home" icon 804 or the "Order Prints Online" icon 805 shown in FIG. 9C. If network printing is selected, the displayed images are uploaded to the photo service provider 40 over the channel 36 (see FIG. 1). This uploading can use the methods described in commonly-assigned U.S. patent application Ser. No. 09/691,364, filed Oct. 18, 2000, entitled "Effective Transfer Of Images From A User To A Service Provider" to Berarducci et. al., the disclosure of which is incorporated herein by reference.

In block 162, the displayed images are printed either as normal prints, or alternatively, as album pages, if the "Album Pages" icon 808 shown in FIG. 9C is selected. If album pages are selected, in block 162 either the CPU motherboard 12 (for local printing) or the production controller 52 (for on-line printing) automatically creates album pages from the selected images. In a preferred embodiment of the present invention, the images are automatically organized into album pages corresponding to the grouping information. In addition, favorite images are used as emphasis images, as described in commonly-assigned U.S. patent application Ser. No. 09/559,478, filed Apr. 27, 2000 by Simon, the disclosure of which is incorporated herein by reference. As described in the Simon et al. patent, the emphasis image is located in the center of the page and is larger than other images on the page. The emphasis image can also be surrounded by a border or other background designed to draw attention to the emphasis image. The album pages can be produced using the methods described in commonly-assigned U.S. Pat. No. 6,004,061 to Manico et al., the disclosure of which is herein incorporated by reference.

Figure 10:
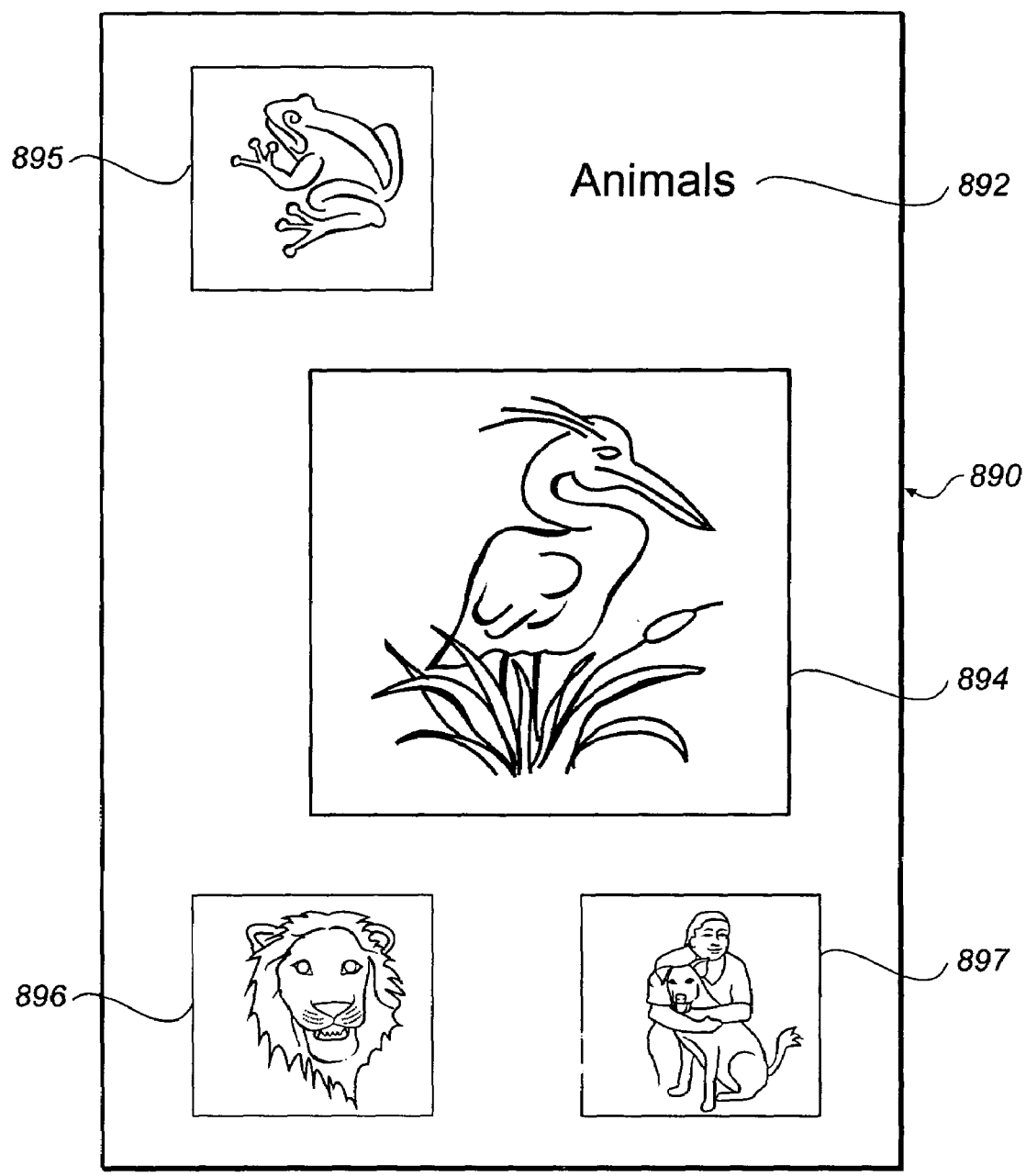
FIG. 10 depicts album pages.

Referring to FIG. 10, there is shown an example of an album page 890. Four images 894, 895, 896, and 897 are formatted and put on the album page 890 by the home computer 10, or by the fulfillment system 50 (see FIG. 1). When the system automatically creates the album page 890, the favorite images are featured. This is accomplished by positioning the most favorite image 894, corresponding to thumbnail image 822G in FIG. 9C, in the center of the album page 890. This is also accomplished by formatting the favorite image 894 so that it is larger in size than the other images on the album page 890. This is further accomplished by providing a background frame that draws attention to the favorite images. The most favorite image(s) are automatically selected from the set of displayed images based on the "favlevel" metadata 666. The album page 890 is automatically labeled with the title 892 that the user entered in the naming window 880 (e.g., "ANIMALS" shown in FIG. 9C). While not shown in FIG. 10, the album page 890 can also include a page number, captions, a creative background, and holes for placing the album page 890 into an album binder.

Figure 11A:
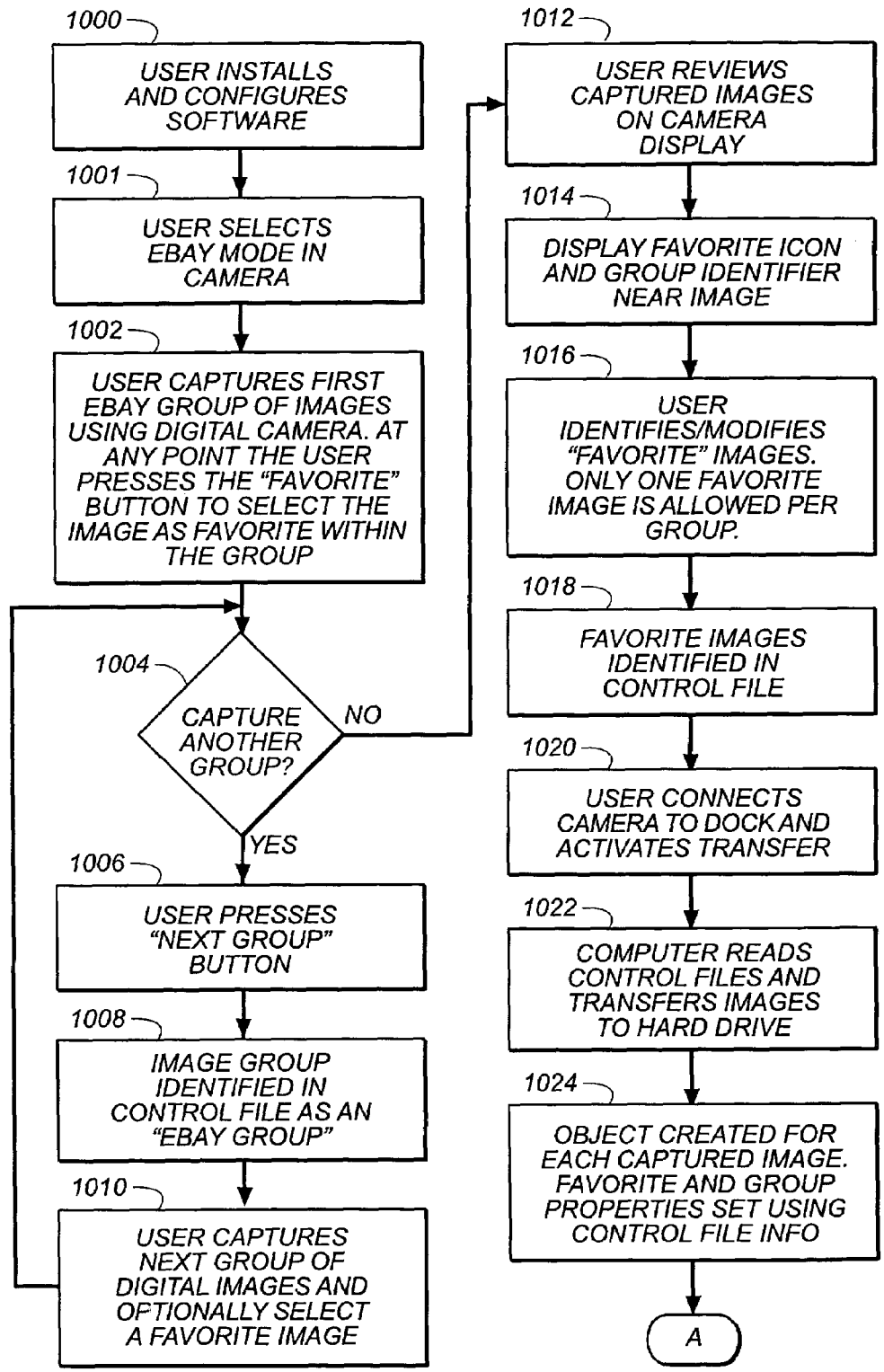
FIGS. 11A and 11B, taken together, depict a flow diagram showing a second embodiment of a method for grouping images, identifying favorite images, and organizing the images in accordance with the present invention.
Figure 11B:
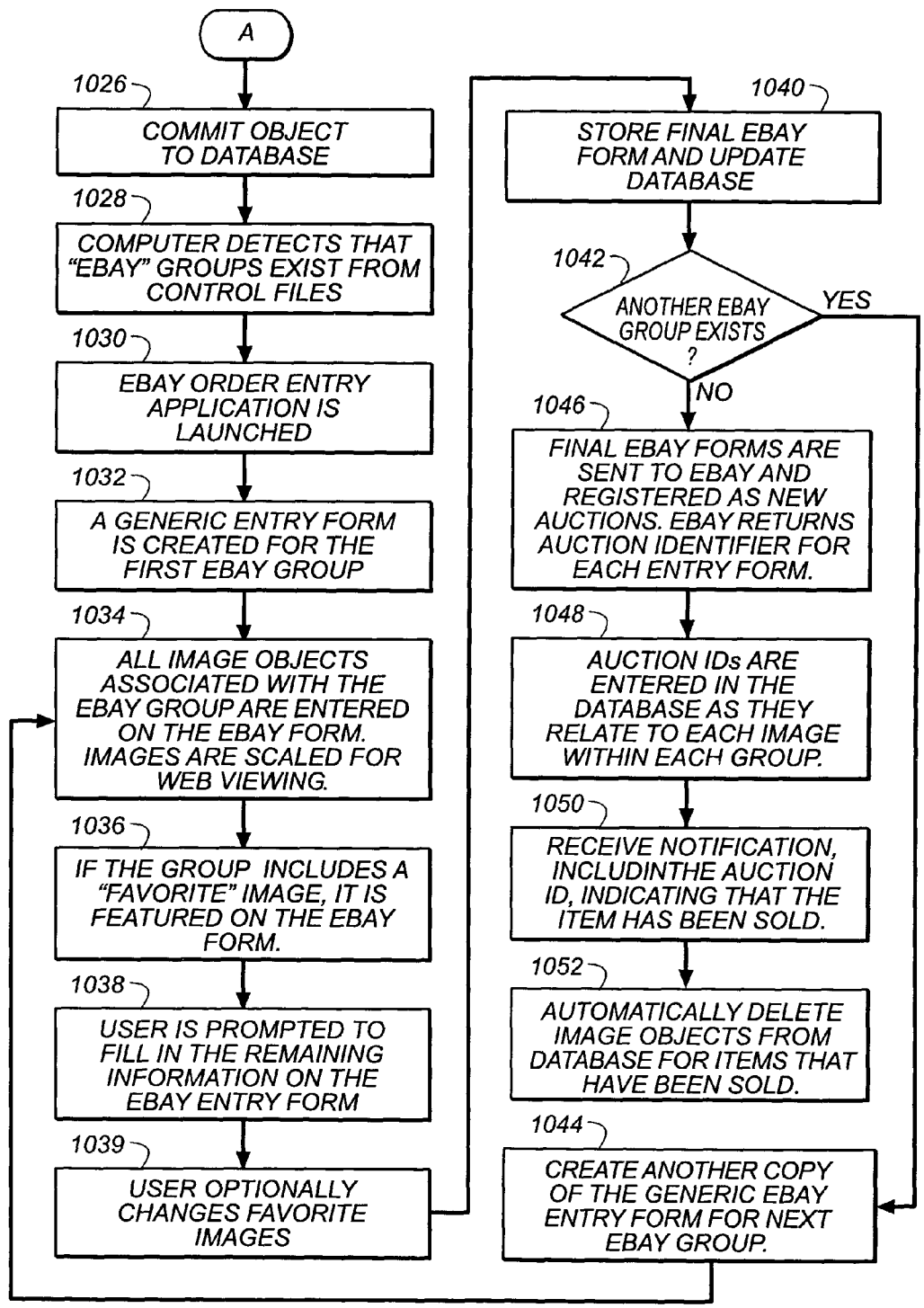

FIGS. 11A and 11B, taken together, depict a flow diagram showing a second embodiment of a method for grouping images, identifying favorite images, and organizing the images in accordance with the present invention. In the method of FIG. 11, the grouping and classification data is used to create "electronic job pages", where each group of images corresponds to one "job", such as an item offered for sale electronically. By grouping the images on the digital camera 300 as they are captured, the process of later creating the "electronic job pages" on a computer is greatly simplified, since the images are already organized into the appropriate job groups.

In block 1000 of FIG. 11A, the user installs and configures the software on the home computer 10, as was described earlier in relation to block 100 of FIG. 3. The installation creates a local database structure on the hard drive 20 of the home computer 10. This local database will later be populated with data that groups and classifies the images which are captured by the digital camera 300 and transferred to the home computer 10.

In some embodiments, the software on the home computer 10 is used to customize the digital camera 300 by storing firmware in the firmware memory 328 that enables a special on-line sales mode, such as an "eBay" mode, which is used to simplify the process of producing electronic job pages, where such pages may, for example, feature (e.g., depict and describe) items offered for sale electronically. The firmware can be added as described in commonly-assigned U.S. patent application Ser. No. 09/549,356, filed Apr. 14, 2000, entitled "Customizing A Digital Camera" to Prabhu et. al., the disclosure of which is herein incorporated by reference. Alternatively, the digital camera 300 can be sold with the "eBay" mode firmware already installed.

In block 1001, the user of the digital camera 300 selects the eBay mode on the digital camera 300. This is preferably done by selecting, from a menu displayed on the color image display 332 (see FIG. 2), the eBay mode using the joystick controller 360 (see FIG. 4). When this mode is selected, the eBay mode firmware stored in firmware memory 328 enables the digital camera 300 to operate most effectively when capturing and organizing images for electronic job pages, by modifying the operations which are performed when the "favorite" button 364 or the "group" button 362 are pressed, as will be described later.

In addition, the firmware can set the camera resolution level to a smaller image size (e.g., the 0.4 MP "web quality" setting), thus producing a smaller image file which is more appropriate for images that are intended to be uploaded and displayed on the Internet. Furthermore, in some embodiments, the firmware can provide, in the on-line sales mode, a lower contrast tone reproduction curve than is used in the normal mode. The lower contrast tone reproduction curve can modify the normal tone reproduction of the digital camera 300 in order to reduce the contrast of the images, and in order to increase the brightness of shadow areas of the image, to allow the details of the object being photographed to be more easily discerned.

In block 1002, a group of digital images, which can be one or more images, is captured using the digital camera 300 and stored as digital image files on the removable memory card 330, as was described earlier with reference to FIG. 2. The images are stored using the directory structure shown in FIG. 5. For example, when the user depresses the shutter button 309 (see FIG. 4) a first digital image is captured and stored as an image file, such as image file 432 in FIG. 5. This first image file is the first image which can be used in a new electronic job page. Therefore, the image processor 320 in the digital camera 300 creates an initial FAVGROUP.MRK file (416 in FIG. 5) containing a single group job that indicates that this first image file 432, named 100__1686.JPG, is the first image of a new group of images. This can be done by writing lines 1 through 8 of the FAVGROUP. MRK control file shown in FIG. 12. The format of the FAVGROUP.MRK file in FIG. 12 is similar to the format of FIG. 6, except that "EBY PID" parameter (lines 6, 14, 22 in FIG. 12) is used to indicate that the groups of images correspond to different electronic job pages.

The user continues to capture additional images for the first eBay electronic job page, corresponding to image files 434 through,436 in FIG. 5. At any time, the user can press the "favorite" button 364 (FIG. 4) to indicate that the picture that has just been captured, is a "favorite" image that should be featured on the electronic job page. For example, the user can select image file 434 (see FIG. 5) as a favorite image, and the processor 320 in the digital camera 300 in response writes lines 9-12 in FIG. 12. In the eBay mode, there is only one favorite per electronic job page, so if the user presses the favorite button again after capturing a subsequent image, this subsequent image becomes the favorite image, and the first image is automatically deselected as a favorite. This is done by modifying the image source indicated by the "IMG SRC" parameter in line 12 of FIG. 12 to provide the pathname to the newly selected favorite image, instead of the original favorite image.

In block 1004, the user decides whether or not to capture another group of images. This next group would be used to create a second eBay electronic job page, corresponding to a second item offered for sale. If yes to block 1004, in block 1006 the user presses the "group" button 362 on the digital camera 300 (see FIG. 4) to indicate that next images to be captured should be used to produce a second electronic job page. Providing a single button, or a similar easy to operate user control, enables the camera user to quickly and easily organize images into different groups corresponding to different items offered for sale, while taking pictures with the digital camera 300. These groups of images can later be automatically organized in electronic job pages after they are transferred to the home computer 10.

In block 1008, the image processor 320 in the digital camera 300 updates the initial FAVGROUP.MRK control file (416 in FIG. 5) to identify the images corresponding to a second electronic job page. This is done after the user presses the shutter button 309 (see FIG. 4) to capture and store the next digital image (e.g., image file 438 in FIG. 5), by appending another JOB including the EBY_PID parameter, indicating that this image is the first image of a second electronic job page. In this example, this is done by writing lines 13 through 16 of the FAVGROUP.MRK file shown in FIG. 12. In block 1010, the user continues to capture additional images in the second group, corresponding to image files 440 through 444 in FIG. 6, and optionally designates one of the images as a favorite image.

Returning to block 1004, the user again decides whether to capture another group of images. If yes to block 1004, block 1006 through 1010 are repeated, for example, to capture and store image files 446 through 452 in FIG. 5 and to create the third electronic job page image group indicated by lines 21 through 24 of the FAVGROUP.MRK file shown in FIG. 12.

In an alternative embodiment, the digital camera 300 includes a microphone (not shown), and the user records a single audio annotation for the group of images as the user presses and holds the "group" button 362. This audio annotation is stored as a separate audio file, such as a wave file, on the removable memory card 330. The audio annotation could describe the subject of the group of photos, or other information common to the group of photos. The FAVGROUP.MRK control file could include the name of this separate audio file created for each group.

If in block 1004 the user decides not to capture additional groups of images (no to block 1004), in block 1012 the user optionally reviews captured images on the color image display 332 of the digital camera 300. The review mode is initiated when the user presses the review button 368 (see FIG. 4). The last captured image file (e.g., file 452 in FIG. 5) is displayed. The user can navigate to review other image files (e.g., files 432 through 450) using the joystick controller 360.

In block 1014, an electronic job page (e.g. eBay group) identifier is displayed near the displayed image. If the current image is the favorite image for that particular eBay group, a favorite icon is also displayed.

In block 1016, the user can modify the "favorite" images by selecting a different image as the "favorite" for that eBay group. The user accomplishes this by pressing the "favorite" button 364 (see FIG. 4) while the new favorite image is displayed. In block 1018, after the user presses the "favorite" button 364, the image processor 320 in the digital camera 300 updates the FAVGROUP.MRK file shown in FIG. 12 to identify the newly selected favorite images (rather than the original favorite images) in lines 12, 20, and/or 28.

In block 1020, the user connects the digital camera 300 to the dock 350, which is connected to the home computer 10 via an interface such as USB, and presses the "transfer" button (not shown) to initiate the image transfer. Alternatively, the user can remove the removable memory card 330 from the digital camera 300 and place the removable memory card 330 in the card reader 24 (see FIG. 1).

In block 1022, the home computer 10 reads the FAVGROUP.MRK file 416 and transfers the image files 432-452 (see FIG. 5) to the hard drive 20 of the home computer 10. The image files are stored in a default directory for electronic job pages, such as in a "my eBay sales" directory, or in a directory selected by the user when the software was installed in block 100 (FIG. 3A). In block 1024, an object is created for each transferred image, and the favorite and electronic job page properties of each object are set to correspond to the information read from the control file in block 122. In block 1026 of FIG. 11B, the object created for each transferred image is committed to the local database stored on the hard drive 20 of the home computer 10. The information stored in general assets table 600 of the local database on hard drive 20 is similar to that described with reference to FIG. 8, except that the group name is automatically populated with a string identifying this as a group of images for an electronic job page, such as the text "eBay Sale".

In block 1028, the CPU motherboard 12 in the home computer 10 detects that at least one "eBay" group exists in the database, for example, by detecting that the database has just been populated with at least one group name string (line 674 in FIG. 8) with a text string of "eBay Sale". In response, in block 1030, the eBay order entry application is launched. In some embodiments, this can be automatically when the transfer is completed.

In block 1032, a generic entry form is created for the first electronic job page. This generic form includes general seller information including, for example, the seller's address, acceptable payment options, and shipping terms, that will be used for numerous electronic job pages associated with a particular seller. This information is entered by the user using the keyboard 16 (see FIG. 1), who is typically the seller. In an alternative embodiment, this information is entered when the user installs the software in block 1000 (FIG. 11A). It is an advantage of the present invention that the general seller information need be entered only one time, instead of having to enter the information separately for each electronic job page.

Figure 13A:
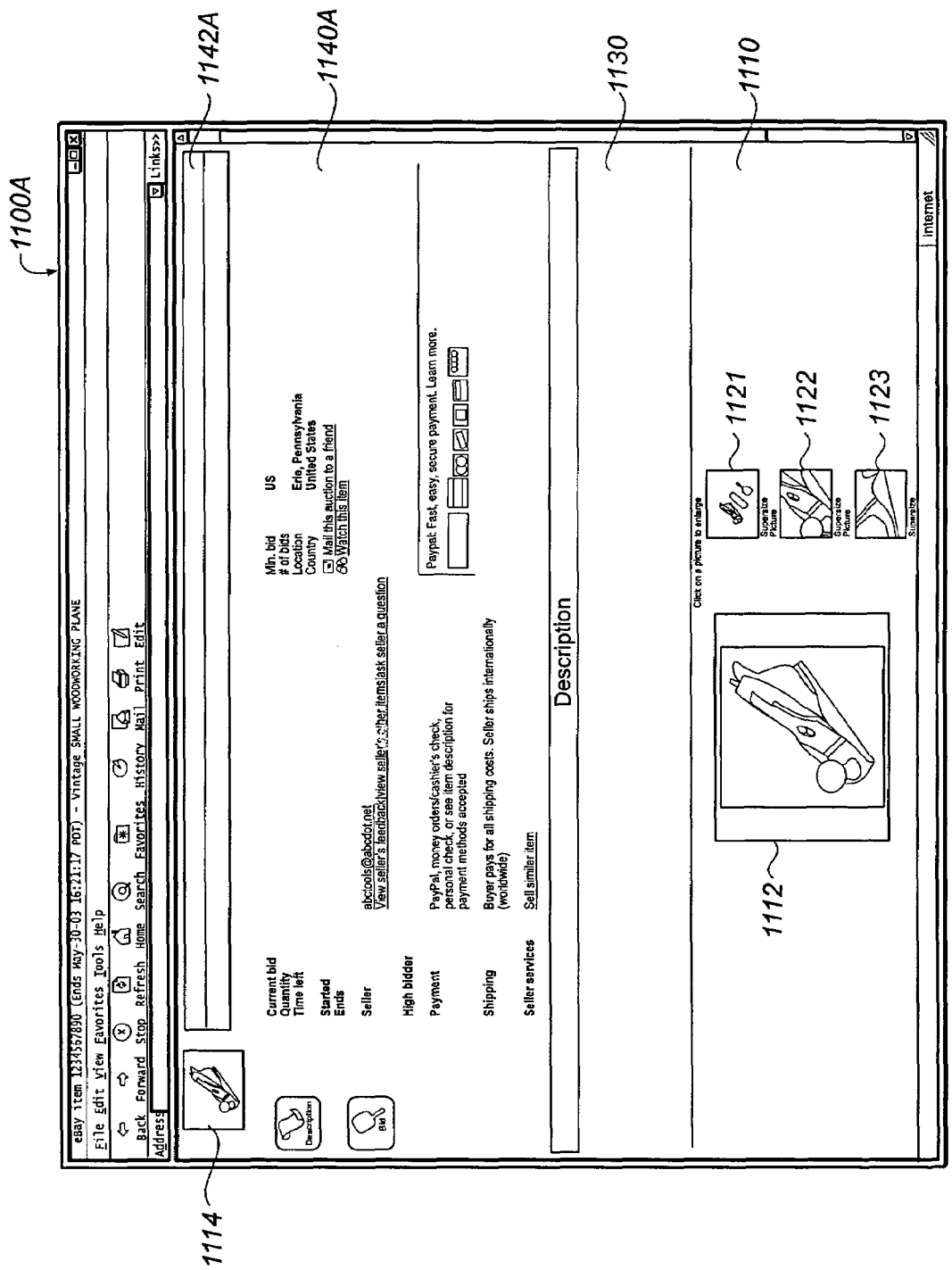
FIG. 13A depicts an example of an initial electronic job page populated with images captured by a digital camera.

In block 1034, all objects associated with the first eBay group are automatically populated into the eBay form, and the images are scaled for web viewing if necessary. If the digital camera 300 was automatically set to "web quality" in block 1001, additional image size scaling is not necessary. FIG. 13A depicts an example of such a form, which provides an initial electronic job page.

In block 1036, if there is a "favorite" image, it is featured on an initial eBay form 1100A. In the example of FIG. 13A, the initial eBay form 1100A includes an image display area 1110 which is populated with four images that correspond to one of the eBay groups (e.g., the $3^{rd}$ eBay group including image files 446-452 in FIG. 5). The image that was identified as the "favorite" for that eBay group (e.g., image file 450)

is displayed as a larger image 1112. The others are displayed as smaller images 1121-1123. The "favorite" image is also displayed as an index image 1114 near the top of the initial eBay form 1100A.

The initial eBay form 1100A also includes a partially completed information window 1140A, which displays the information entered by the user during block 1032 of FIG. 11B. Examples of this information include the seller's email address, location, and country, and the acceptable payment methods and shipping terms. Some of the information is not yet filled out however, such as the minimum bid, or the starting or ending date of the sale. The initial eBay form 1100A also includes a blank sale item name area 1142A and a blank description area 1130.

Figure 13B:
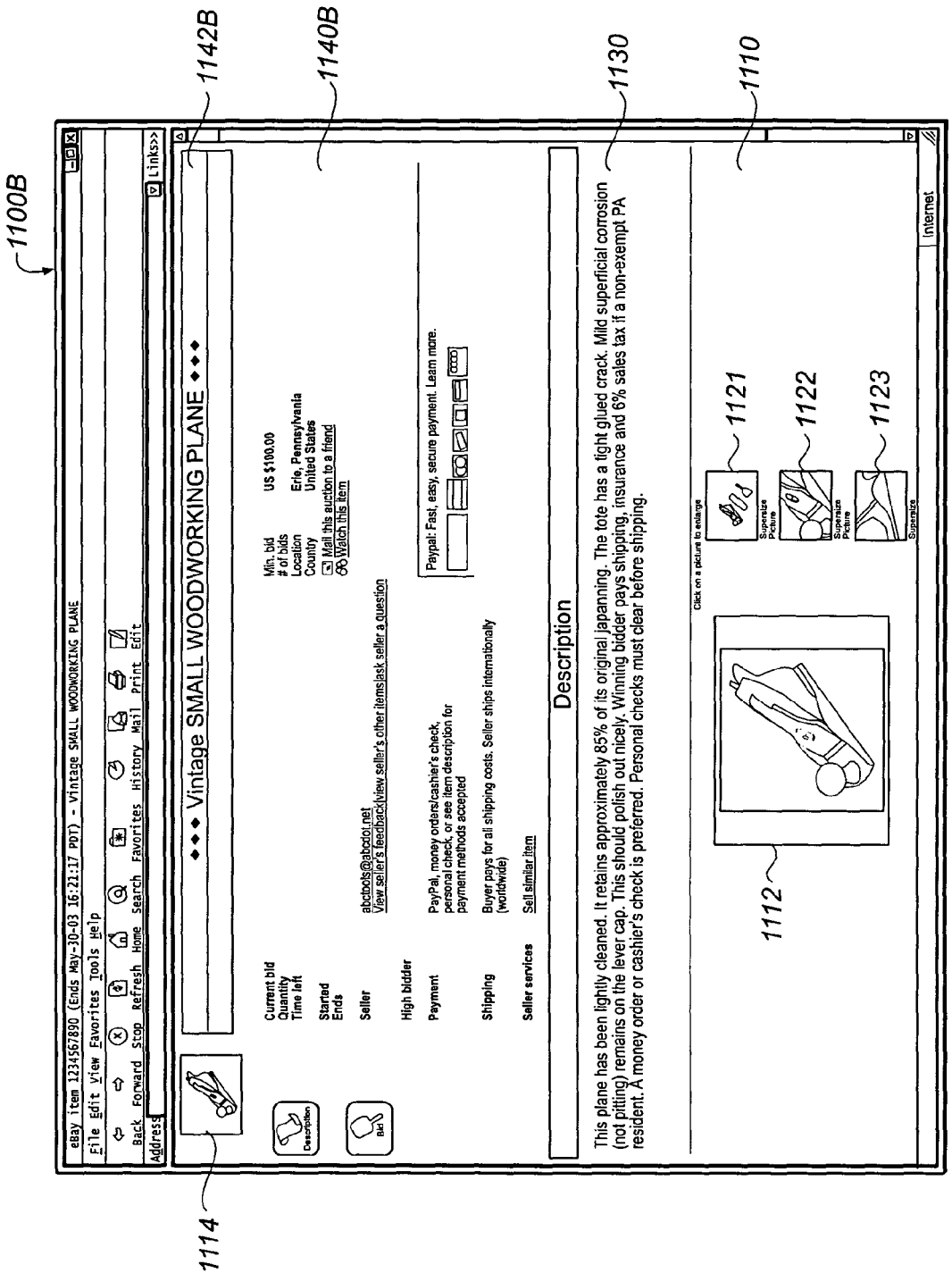
FIG. 13B depicts an example of a completed electronic job page.

In block 1038, the user is prompted to fill in the remaining information on the eBay form 1100A. The result is the final eBay form 1100B depicted in FIG. 13B. The remaining information is specific to the item offered for sale, and includes the sale item name 1142B, the description 1130 of the item, and the minimum bid and starting/ending date entered in window 1140B.

In block 1039, the user optionally changes the favorite image, for example, by dragging and dropping one of the small images 1121, 1122, or 1123 into the area which displays the larger favorite image 1112. In response, the selected smaller image now becomes the favorite image, and is displayed as the larger image 1112 (and as index image 1114) while the initial favorite image is displayed as a smaller image.

In block 1040, the final eBay form 1100B is stored on the hard drive 20 of the home computer 10, and the database (e.g., the general assets table 600) is updated to indicate that an electronic job page has been created using the first eBay group.

In block 1042, the database is checked to determine if there is another eBay group that has not yet been entered into an eBay form. If yes to block 1042, in block 1044 a copy of the generic entry form is created for the next eBay group, and blocks 1034 through 1042 are repeated.

If another eBay group does not exist (no to block 1042), in block 1046 all of the final eBay forms are sent to eBay and registered as new auctions. This can be accomplished by the host computer 10 communicating with the electronic auction provider 80 (e.g., eBay) via the Internet Service Provider 30 and the channel 36, as shown in FIG. 1. This communication includes transferring the images used in each form from the hard drive 20 to the electronic auction provider 80. In response, the electronic auction provider 80 returns an auction identifier for each entry form. The auction identifier can be a serial number assigned to the each electronic job form by the electronic auction provider 80.

In block 1048, the auction identifiers are entered into the local database. In one embodiment, the auction identifiers are appended to each image used in one of the electronic job pages uploaded in block 1046.

In block 1050, the home computer 10 receives from the electronic auction provider 80 a notification indicating that one or more of the items has been sold.

In block 1052, the image files and image database objects corresponding to the items that have been sold are automatically deleted from the hard drive 20 of the home computer 10.

Figure 14A:
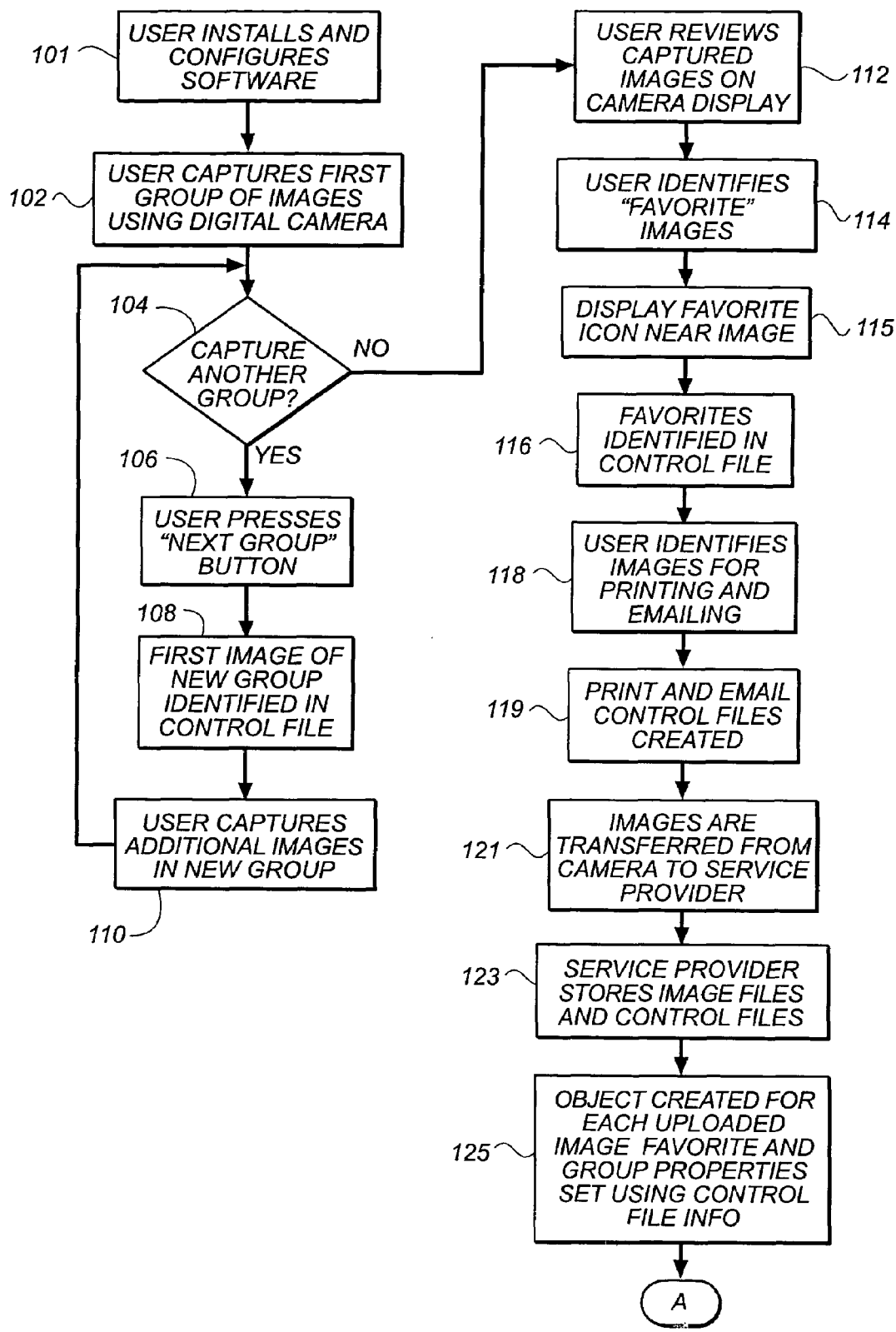
FIGS. 14A and 14B, taken together, depict a flow diagram showing a third embodiment of a method for grouping images, identifying favorite images, and organizing the images in accordance with the present invention.
Figure 14B:
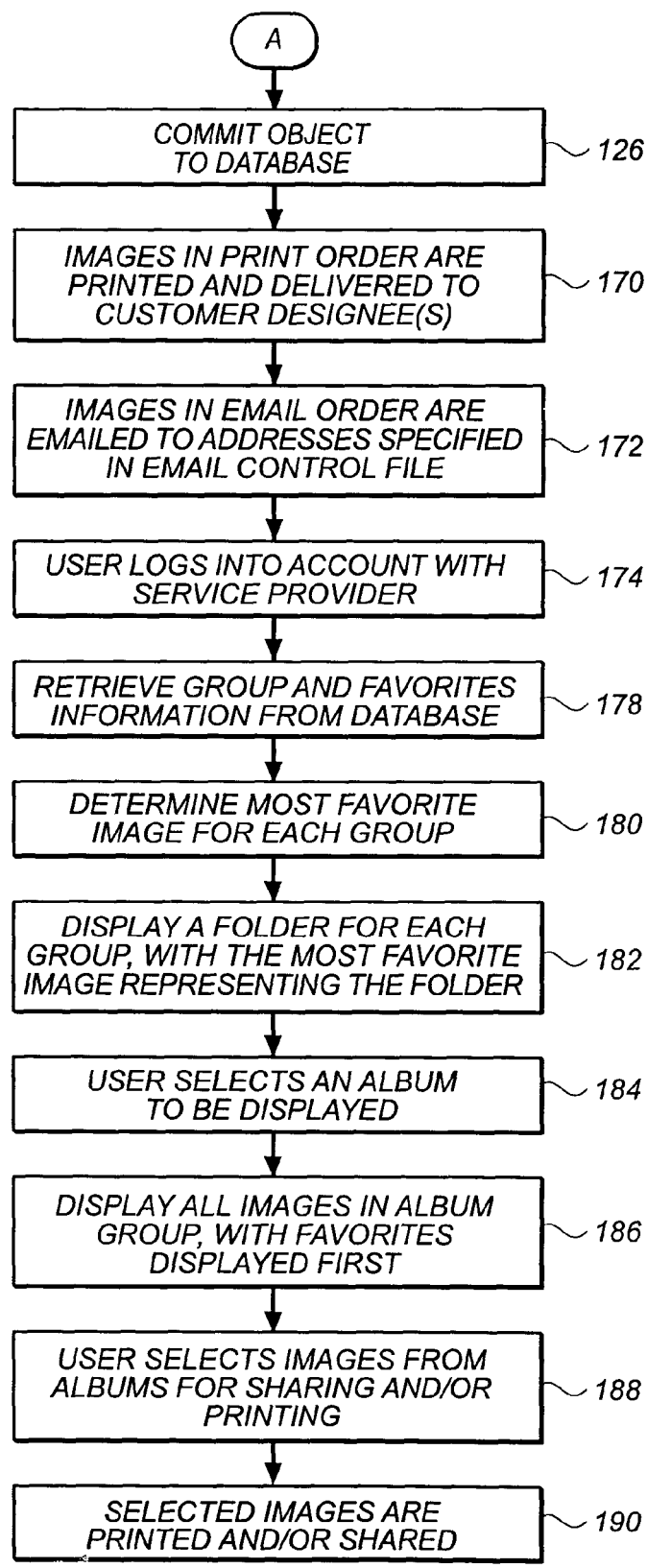

FIGS. 14A and 14B, taken together, depict a flow diagram showing a third embodiment of a method for grouping images, identifying favorite images, and organizing the images in accordance with the present invention. In this embodiment, the digital camera 300 includes a modem (not shown) which transmits some or all of the captured images to a service provider, and the grouping and classification information is used to simplify the process of organizing the images stored by the service provider into albums which can be easily selected by the user or by others authorized to view the uploaded images.

In block 101, the user installs and configures their digital camera 300 and service account so that the digital camera 300 can communicate with the service provider in way that enables the captured images to be stored in the proper service account. This can include providing a configuration file as described in commonly-assigned U.S. patent application Ser. No. 09/004,046, filed Jan. 7, 1998, entitled "Network Configuration File For Automatically Transmitting Images From An Electronic Still Camera" to Ward et. al., the disclosure of which is incorporated herein by reference. It can also include establishing a service user account which specifies user selected photo product options, such as customized album pages, as well as delivery and billing information, as described in commonly-assigned U.S. patent application Ser. No. 09/576,288, filed May 23, 2000, entitled "Method For Providing Customized Photo Products Over A Network" to Parulski, the disclosure of which is incorporated herein by reference. In a preferred embodiment, the digital camera 300 stores the service account identifier in the firmware memory 328 of the digital camera 300 (see FIG. 2).

Blocks 102 through 119 of FIG. 14A are the same as the corresponding blocks in FIG. 3A.

In block 121 of FIG. 14A the captured images (e.g., image files 432-452 in FIG. 5) and the control files (e.g., files 412-426) are transferred from the digital camera 300 to the service provider via the modem (not shown). The modem is preferably a wireless modem, such as a cellular phone modem or an 802.11 type modem. Alternatively, the modem can be a wired modem which connects to a telephone jack.

In block 123, the photo service provider 40 (see FIG. 1) stores the image files and control files in the service provider database 44.

In block 125, the photo service provider 40 creates an object for each uploaded image in a database, which can be, for example, the general assets table 600 described earlier with reference to FIG. 8. In this case, there is a general assets table 600 for each user account. The favorite and group properties in the database are set using the information in the FAVGROUP.MRK file 416 (see FIG. 5) as described earlier.

In block 126 of FIG. 14B, the object is committed to the database as described earlier with reference to block 126 of FIG. 3B.

In block 170, the images specified in the AUTPRINT. MRK print order control file 412 are printed and delivered to the address(es) provided in step 101 of FIG. 14A.

In block 172, the images specified in the AUTXFER. MRK email order control file 414 are emailed to the email addresses specified in the file.

In block 174, the user (or another person authorized by the user to view one or more of their on-line image albums) logs into their account with the service provider.

In block 178, the photo service provider 40 retrieves the group and favorites information from the service provider database (e.g., from the user's general assets table 600).

In block 180, the photo service provider determines the most favorite image for each group. If there is no favorite image specified for a group, the first (or alternatively, the last) image of the group is used. If the group includes more than one favorite image, the first (or alternatively, the last) favorite image is used.

Figure 15:
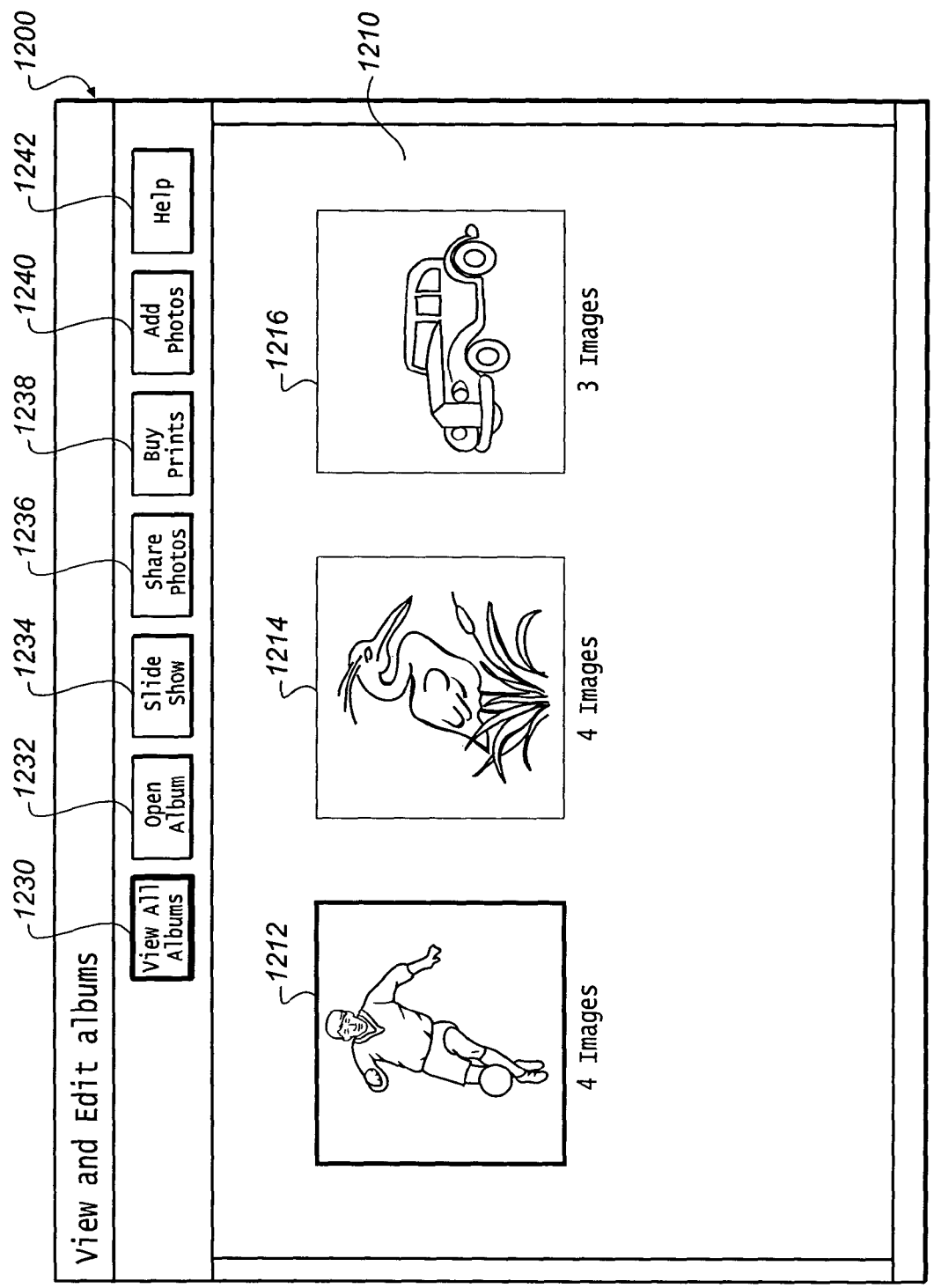
FIG. 15 depicts a computer user interface screen for displaying uploaded image albums.

In block 182, the photo service provider 40 provides, via the Internet server 42, images and information to the home computer 10 which is displayed on the display monitor 14 as a computer user interface screen (GUI screen). FIG. 15 is an illustrative example of a GUI screen 1200. The GUI screen 1200 includes a display window 1210 which displays three images 1212, 1214, and 1216 representing three different electronic albums. The images 1212, 1214, 1216 are provided using the thumbnail image data 616 from the user's general assets table 600 (see FIG. 8). The particular images displayed correspond to the images identified as favorite images for each group in block 114 of FIG. 14A.

The GUI screen 1200 also includes a number of icons 1230-1242 that can be selected by the user. These icons include the "View all Albums" icon 1230, which is automatically selected when the user logs on in block 176, so that the GUI screen 1200 is automatically displayed. These icons also include an "Open album" icon 1232 that can be used to display the images within one of the albums (e.g., the images within the album corresponding to image 1212, which is highlighted as being currently selected by the user). The icons also include a "Slide show" icon 1234 which can be used to automatically display in sequence all of the images in the selected album as a slide show, a "Share Photos" icon 1236 that can be used to enable another GUI screen (not shown) to allow images in a selected album to be shared with one or more designees of the user, a "Buy Prints" icon 1238 that can be used to enable another GUI screen (not shown) to allow prints of selected images to be purchased, an "Add Photos" icon 1240 that can be used to enable another GUI screen (not shown) to allow the user to upload additional images, and a "Help" icon 1242 that can be used to enable another GUI screen (not shown) to assist the user in using the services provided by the photo service provider 40.

In block 184 of FIG. 14B, the user selects an album to be displayed by selecting the "favorite" image that serves to identify one of the albums (e.g., image 1212 in FIG. 15) and then selecting the "Open album" icon 1232, or alternatively, by "double-clicking" on the image (e.g., double-clicking on image 1212).

Figure 16:
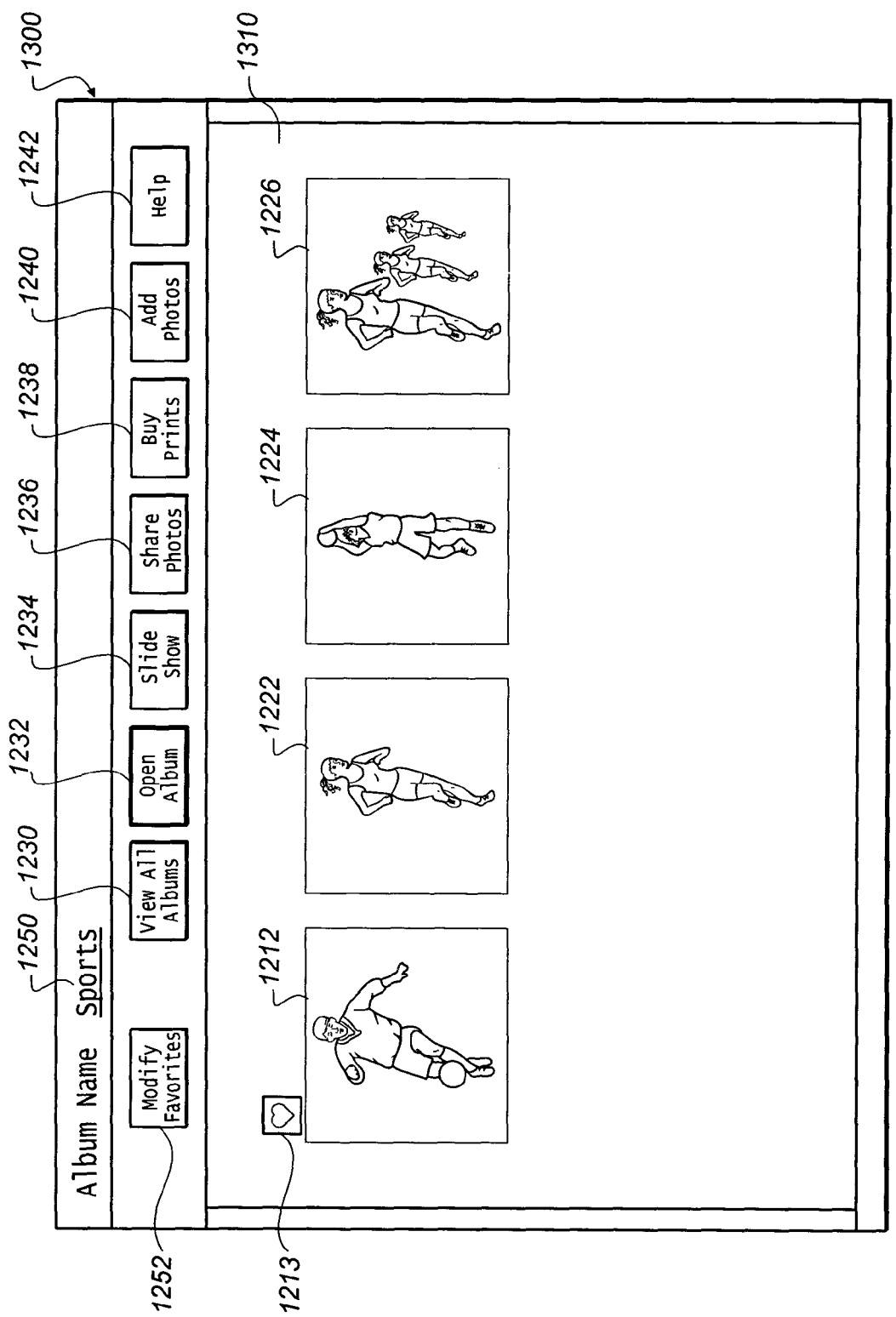
FIG. 16 depicts a computer user interface screen for displaying an image with an album.

In block 186, the thumbnails of all of the images are displayed, with the favorite(s) first, since there are likely to be of most interest to the user. FIG. 16 is an illustrative example of a GUI screen 1300. The GUI screen 1300 includes a display window 1310, which displays the four images 1212, 1222, 1224, and 1226 (corresponding to image files 446-452 in FIG. 5) which are included in the album. The images 1212, 1222, 1224, and 1226 are provided using the thumbnail image data 616 from the user's general assets table 600 (see FIG. 8). A favorites icon 1213 is displayed near image 1212, since this image is currently a favorite image. The user can modify the favorite selection by selecting the "Modify Favorites" icon 1252. This brings up another GUI screen (not shown) enabling the user to modify the favorite images, similar to as was described earlier with reference to blocks 136-138 of FIG. 3. The user can also name the album by typing in a name in an "Album Name" area 1250.

In block 188, the user can select images from the album for sharing and/or printing. In block 190, the selected images are printed and/or shared.

Alternatively, it would be understood to those skilled in the art that the images captured using the digital camera 300 can be transferred to the home computer 10 and stored on the hard drive 20, and data identifying the first and second groups of digital images and the identified favorite images can be read from the control file 416 (see FIG. 5) and added to the local database described earlier with reference to FIG. 8. Each group of digital images is then organized as an electronic album, using the data in the local database, and is displayed on the display monitor 14. A user then selects an electronic album by selecting the associated favorite image in a manner similar to that described earlier with reference to FIG. 15. The group of digital images associated with each electronic album can be viewed (for example, as a slide show or as was described with reference to FIG. 16), or can be shared or printed as was previously described. Prints can be made locally using printer 26 (FIG. 1), or the digital images to be printed can be transferred via the channel 36 to the photo service provider 40 which can provide the digital images to the fulfillment system 50 for printing using the color printer 54.

A computer program product in accordance with the present invention can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention. For example, instead of allowing only two "favorite" levels (e.g., normal and favorite) to be selected, the user interface of the digital camera 300 could enable more levels (e.g., extra favorite, non-favorite) to be selected. In addition, in some embodiments only certain images (such as favorites) could be uploaded to the photo service provider 40 via the modem, while all of the images (including normal and non-favorite images) could be transferred to the hard drive 20 of the home computer 10.

PARTS LIST

10 home computer
12 CPU motherboard
14 monitor
16 keyboard
18 pointing device
20 hard drive
22 modem
24 card reader
26 printer
30 Internet service provider
32 modems
34 computers/routers
36 channel
40 photo service provider
42 Internet server
44 service provider database
46 billing system
48 bill issuing
52 production controller
54 color printer
66 photo product

PARTS LIST 70 shipping system
72 shipping label printer
74 shipping label
76 disc writer
300 digital camera
302 flash
303 user controls
304 control processor and timing generator circuit
305 optical viewfinder
306 clock drivers
309 shutter button
310 zoom and focus motors
311 zoom lens control rocker switch
312 zoom lens
314 image sensor
316 ASP & A/D converter circuit
318 DRAM buffer memory
320 image processor
322 host interface
324 memory card interface
326 RAM memory
328 firmware memory
330 removable memory card
332 color LCD image display
342 interface cable
350 dock
360 joystick
362 group button
364 favorite button
366 menu button
368 review button
370 mode dial
390 video driver
392 TV monitor
400 root directory
410 MISC directory
412 control file
414 control file
416 control file
420 DCIM directory
430 subdirectory
432-452 image files
500A GUI screen
500B GUI screen
502A display area
502B display area
504A display window
504B display window
506B "favorite" indicator
600 general assets table
610 table of data fields
612 metadata field
614 data type
616 expose value
632-652 image data object
660-692 metadata
800A GUI screen
800B GUI screen
800C GUI screen
802 "My Collection" tab
804 "Print at Home" tab
805 "Order Prints Online" tab
806 "Email" tab
808 "Album Pages" tab
810 display format selection area
812 "Single" display icon
814 "Thumbnails" display icon
816 "Details" display icon
820 image display area
822A-822K thumbnail images
825 slider
830 "Slide Show" icon
832 "Label" icon
834 "Rotate" icon
836 "Open/Edit" icon
838 "Properties" icon
840 display selection area
842 selector
843 group number/name box
844 sort items text box
846 pull-down arrow icon
848 reserve order checkbox
852 "To Do List" icon
860 favorites level selection area
862 selector
890 album page
892 album page name
894 most favorite image
895 favorite image
896 favorite image
897 favorite image
1100A initial eBay form
1100B final eBay form
1110 image display area
1112 favorite eBay image
1114 index image
1121 eBay image
1122 eBay image
1123 eBay image
1130 description area
1140A information window
1140B information window
1142A blank sale item name area
1142A sale item name
1200 GUI screen
1210 display window
1212 electronic album image
1213 favorites icon
1214 electronic album image
1216 electronic album image
1230 "View all Albums" icon
1232 "Open album" icon
1234 "Slide show" icon
1236 "Share Photos" icon
1238 "Buy Prints" icon
1240 "Add Photos" icon
1242 "Help" icon
1250 "Album Name" area
1252 "Modify Favorites" icon
1300 GUI screen
1310 display area

What is claimed is:

1. A method for capturing images using a digital camera and organizing the captured images for storage into electronic albums, comprising the steps of:

a) capturing and storing a first group of digital images using a digital camera;

b) designating, in response to a user input, that subsequent captured digital images are to form a second group of digital images;

c) capturing and storing a second group of digital images using the digital camera;

d) identifying at least one favorite image for the first group of digital images, and at least one favorite image for the second group of digital images;

e) storing data in the digital camera identifying the first and second groups of digital images, including data indicating the identified favorite images from the first and second groups of digital images, the stored data comprising one or more control files;

f) transferring the first and second groups of digital images, and the data comprising the one or more control files identifying the first and second groups of digital images and the identified favorite images, from the digital camera to a computer, wherein the computer stores the transferred digital images in a directory, creates separate objects in a database for respective ones of the transferred digital images with each of the objects comprising fields for group and favorite information, and populates the group and favorite fields of the database objects with data read from the one or more control files;

g) producing from the transferred digital images and the group fields of the database objects a first electronic album including the first group of digital images and a second electronic album including the second group of digital images; and h) using the favorite image from the first group of digital images to represent the first electronic album, and the favorite image from the second group of digital images to represent the second electronic album, the favorite images from the first and second groups being determined from the favorite fields of the database objects.

2. The method of claim 1 wherein the computer is located at a photo service provider.

3. The method of claim 2 further comprising the step of transferring from the photo service provider via the Internet to a home computer, the favorite images which represent the first and second electronic albums.

4. The method of claim 3 further comprising the step of displaying, on a display monitor of the home computer, the favorite images which represent the first and second electronic albums.

5. The method of claim 4 further comprising the step of, in response to a user selecting the favorite image representing the first electronic album, displaying the first group of digital images on the display monitor.

6. The method of claim 5 further comprising the step of providing a GUI screen to enable a user to purchase at least one print of at least one of the displayed images.

7. The method of claim 6 further comprising the step of producing and shipping the at least one print to a designee of the user.

8. The method of claim 4 further comprising the step of providing, along with the displayed favorite images, an icon which can be selected by a user to automatically display in sequence the images in a selected electronic album as a slide show.

9. The method of claim 4 further comprising the step of providing, along with the displayed favorite images, an icon which can be selected by a user to automatically share the images in a selected electronic album with at least one designee of the user.

10. The method of claim 1 wherein the first and second groups of digital images, and the data identifying the first and second groups of digital images and the identified favorite images, are transferred to the computer via a modem.

11. The method of claim 10 wherein the modem is a cellular phone modem.

12. The method of claim 10 wherein the modem is an 802.11 type modem.

13. The method of claim 1 wherein the first and second groups of digital images, and the data identifying the first and second groups of digital images and the identified favorite images, are transferred to the computer via a cable.

14. The method of claim 13 wherein the cable is a USB cable.

15. The method of claim 1 wherein the computer is a home computer, and the transferred digital images are stored in a memory of the home computer.

16. The method of claim 15 further comprising the step of displaying, on a display monitor of the home computer, the favorite images which represent the first and second electronic albums.

17. The method of claim 16 further comprising the step of, in response to a user selecting the favorite image representing the first electronic album, displaying the first group of digital images on the display monitor.

18. The method of claim 17 further comprising the step of providing a GUI screen to enable a user to purchase at least one print of at least one of the displayed digital images.

19. The method of claim 18 further comprising the steps of transferring the at least one digital image to be printed to a photo service provider, and the photo service provider producing and shipping the at least one print to a designee of the user.

20. The method of claim 16 further comprising the step of providing, along with the displayed favorite images, an icon which can be selected by a user to automatically display in sequence the images in a selected electronic album as a slide show.

21. The method of claim 16 further comprising the step of providing, along with the displayed favorite images, an icon which can be selected by a user to automatically share the images in a selected electronic album with at least one designee of the user.

22. A method for producing and selecting a plurality of electronic albums, comprising the steps of:

a) providing first and second groups of digital images to a computer;

b) identifying at least one favorite image for the first group of digital images, and at least one favorite image for the second group of digital images;

c) storing data in a memory of the computer identifying the first and second groups of digital images, including data indicating the identified favorite images from the first and second groups of digital images;

d) producing a first electronic album including the first group of digital images and a second electronic album including the second group of digital images; and e) using the favorite image from the first group of digital images to represent the first electronic album, and the favorite image from the second group of digital images to represent the second electronic album;

wherein the first and second groups of digital images are captured by a digital camera and subsequently transferred to the computer, the digital camera being operative to store the images in an associated storage device with at least one control file that is separate from the stored images and identifies the respective favorite images for the first and second groups;

wherein said at least one control file is transferred from the digital camera to the computer;

wherein the computer stores the transferred digital images in a directory, creates separate objects in a database for respective ones of the transferred digital images with each of the objects comprising fields for group and favorite information, and populates the group and favorite fields of the database objects with data read from said at least one control file;

the first and second electronic albums being produced from the transferred digital images and the group fields of the database objects; and the favorite images from the first and second groups being determined from the favorite fields of the database objects.

23. The method of claim 22 wherein the computer is located at a photo service provider.

24. The method of claim 23 further comprising the step of transferring from the photo service provider via the Internet to a home computer, the favorite images which represent the first and second electronic albums.

25. The method of claim 24 further comprising the step of displaying, on a display monitor of the home computer, the favorite images which represent the first and second electronic albums.

26. The method of claim 25 further comprising the step of, in response to a user selecting the favorite image representing the first electronic album, displaying the first group of digital images on the display monitor.

27. The method of claim 26 further comprising the step of providing a GUI screen to enable a user to purchase at least one print of at least one of the displayed images.

28. The method of claim 27 further comprising the step of producing and shipping the at least one print to a designee of the user.

29. The method of claim 25 further comprising the step of providing, along with the displayed favorite images, an icon which can be selected by a user to automatically display in sequence the images in a selected electronic album as a slide show.

30. The method of claim 25 further comprising the step of providing, along with the displayed favorite images, an icon which can be selected by a user to automatically share the images in a selected electronic album with at least one designee of the user.

31. The method of claim 22 wherein the computer is a home computer.

32. The method of claim 31 further comprising the step of displaying, on a display monitor of the home computer, the favorite images which represent the first and second electronic albums.

33. The method of claim 32 further comprising the step of, in response to a user selecting the favorite image representing the first electronic album, displaying the first group of digital images on the display monitor.

34. The method of claim 33 further comprising the step of providing a GUI screen to enable a user to purchase at least one print of at least one of the displayed digital images.

35. The method of claim 34 further comprising the steps of transferring the at least one digital image to be printed to a photo service provider, and the photo service provider producing and shipping the at least one print to a designee of the user.

36. The method of claim 32 further comprising the step of providing, along with the displayed favorite images, an icon which can be selected by a user to automatically display in sequence the images in a selected electronic album as a slide show.

37. The method of claim 32 further comprising the step of providing, along with the displayed favorite images, an icon which can be selected by a user to automatically share the images in a selected electronic album with at least one designee of the user.

* * * * *